(12) United States Patent
German et al.

(10) Patent No.: US 9,538,262 B2
(45) Date of Patent: Jan. 3, 2017

(54) SYSTEMS, EQUIPMENT AND METHODS FOR AUTOMATICALLY TRACKING CABLE CONNECTIONS AND FOR IDENTIFYING WORK AREA DEVICES AND RELATED METHODS OF OPERATING COMMUNICATIONS NETWORKS

(75) Inventors: Michael G. German, Secaucus, NJ (US); Peter T. Tucker, Dallas, TX (US); Matias Peluffo, El Casar de Talamanca (ES); Luc Walter Adriaenssens, Frisco, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 1877 days.

(21) Appl. No.: 12/787,486

(22) Filed: May 26, 2010

(65) Prior Publication Data
US 2011/0043371 A1    Feb. 24, 2011

Related U.S. Application Data

(63) Continuation-in-part of application No. 12/545,096, filed on Aug. 21, 2009, now Pat. No. 8,994,547.

(51) Int. Cl.
*G08B 5/00*      (2006.01)
*H04L 12/26*    (2006.01)
(Continued)

(52) U.S. Cl.
CPC ................... *H04Q 1/136* (2013.01)

(58) Field of Classification Search
CPC ........... G08B 5/00; G08B 13/12; H04L 12/26; H04B 3/36; H01R 3/00
(Continued)

(56) References Cited

U.S. PATENT DOCUMENTS

| 4,491,781 A | 1/1985 | McClintic |
| 5,394,503 A | 2/1995 | Dietz et al. |

(Continued)

FOREIGN PATENT DOCUMENTS

| CN | 1849775 A | 10/2006 |
| CN | 1983980 A | 6/2007 |

(Continued)

OTHER PUBLICATIONS

Notification of Transmittal of the International Preliminary Report on Patentability, corresponding International Application No. PCT/US2010/046132; Date of mailing: Dec. 1, 2011; 19 pages.

(Continued)

*Primary Examiner* — Nam V Nguyen
(74) *Attorney, Agent, or Firm* — Fogg & Powers LLC

(57) ABSTRACT

Methods for collecting information regarding a remote connector port that is connected to a patch panel connector port by a communications cable that has at least one data communications channel and a separate control channel are provided in which a first conductor of the separate control channel of the communications cable is biased to power an integrated circuit chip that is associated with the remote connector port. A first signal is transmitted over the separate control channel of the communications cable to the integrated circuit chip associated with the remote connector port. A second signal is received from the integrated circuit chip over the separate control channel of the communications cable in response to the first signal. The second signal includes information regarding the remote connector port.

26 Claims, 21 Drawing Sheets

(51) Int. Cl.
*H04B 3/36* (2006.01)
*H01R 3/00* (2006.01)
*H04Q 1/02* (2006.01)

(58) Field of Classification Search
USPC .......... 340/687, 686; 439/490, 49, 955, 489; 709/253, 220; 361/780; 702/127, 188
See application file for complete search history.

(56) References Cited

U.S. PATENT DOCUMENTS

| | | | |
|---|---|---|---|
| 5,407,864 A | 4/1995 | Kim | |
| 5,541,586 A | 7/1996 | Wise | |
| 5,550,755 A | 8/1996 | Martin et al. | |
| 5,764,043 A | 6/1998 | Czosnowski | |
| 5,854,824 A | 12/1998 | Bengal et al. | |
| 6,002,331 A | 12/1999 | Laor | |
| 6,175,865 B1* | 1/2001 | Dove et al. | 709/220 |
| 6,222,908 B1 | 4/2001 | Bartolutti et al. | |
| 6,285,293 B1* | 9/2001 | German et al. | 340/687 |
| 6,330,307 B1 | 12/2001 | Bloch et al. | |
| 6,350,148 B1 | 2/2002 | Bartolutti et al. | |
| 6,424,710 B1 | 7/2002 | Bartolutti et al. | |
| 6,448,899 B1* | 9/2002 | Thompson | 340/815.4 |
| 6,461,054 B1* | 10/2002 | Iwase | 385/73 |
| 6,522,737 B1 | 2/2003 | Bartolutti et al. | |
| 6,688,910 B1 | 2/2004 | Macauley | |
| 6,725,177 B2 | 4/2004 | David et al. | |
| 6,871,156 B2* | 3/2005 | Wallace et al. | 702/127 |
| 6,961,675 B2 | 11/2005 | David | |
| 7,028,087 B2 | 4/2006 | Caveney | |
| 7,153,142 B2 | 12/2006 | Shifris et al. | |
| 7,160,143 B2 | 1/2007 | David et al. | |
| 7,193,422 B2 | 3/2007 | Velleca et al. | |
| 7,217,152 B1 | 5/2007 | Xin et al. | |
| 7,234,944 B2* | 6/2007 | Nordin et al. | 439/49 |
| 7,265,300 B2 | 9/2007 | Adriaenssens et al. | |
| 7,297,018 B2 | 11/2007 | Caveney et al. | |
| 7,370,106 B2 | 5/2008 | Caveney | |
| 7,376,734 B2 | 5/2008 | Caveney | |
| 7,459,640 B2 | 12/2008 | Adriaenssens et al. | |
| 7,468,669 B1 | 12/2008 | Beck et al. | |
| 7,488,206 B2 | 2/2009 | Caveney et al. | |
| 7,517,243 B2 | 4/2009 | Caveney et al. | |
| 7,519,000 B2 | 4/2009 | Caveney et al. | |
| 7,534,137 B2 | 5/2009 | Caveney et al. | |
| 7,563,102 B2* | 7/2009 | Nordin et al. | 439/49 |
| 7,573,254 B2 | 8/2009 | Cobb et al. | |
| 7,613,124 B2* | 11/2009 | Caveney | 370/248 |
| 7,636,050 B2 | 12/2009 | Nordin et al. | |
| 7,656,903 B2 | 2/2010 | Caveney | |
| 7,674,126 B2 | 3/2010 | Below et al. | |
| 7,717,734 B2 | 5/2010 | Caveney et al. | |
| 7,756,047 B2* | 7/2010 | Caveney | 370/248 |
| 7,811,119 B2* | 10/2010 | Caveney et al. | 439/489 |
| 7,841,891 B2 | 11/2010 | Caveney et al. | |
| 7,934,022 B2* | 4/2011 | Velleca et al. | 709/253 |
| 7,938,700 B2* | 5/2011 | Jacks et al. | 439/88 |
| 7,959,460 B2 | 6/2011 | Caveney et al. | |
| 7,969,320 B2* | 6/2011 | Nordin et al. | 340/635 |
| 7,980,889 B2 | 7/2011 | Caveney et al. | |
| 8,089,976 B2 | 1/2012 | Caveney et al. | |
| 8,128,428 B2 | 3/2012 | Caveney et al. | |
| 8,246,397 B2 | 8/2012 | Jacks et al. | |
| 8,340,093 B2 | 12/2012 | Shifris et al. | |
| 8,376,787 B2* | 2/2013 | Panella et al. | 439/676 |
| 8,419,465 B2 | 4/2013 | Jacks et al. | |
| 8,427,964 B2 | 4/2013 | Caveney | |
| 8,477,031 B2* | 7/2013 | McNally et al. | 340/568.2 |
| 2002/0062985 A1 | 5/2002 | Rutledge et al. | |
| 2002/0117330 A1 | 8/2002 | Eldridge et al. | |
| 2003/0073343 A1 | 4/2003 | Belesimo | |
| 2005/0266719 A1 | 12/2005 | Pepe | |
| 2006/0148279 A1 | 7/2006 | German et al. | |
| 2006/0160395 A1 | 7/2006 | Macauley et al. | |
| 2007/0117444 A1 | 5/2007 | Caveney et al. | |
| 2007/0197094 A1 | 8/2007 | Velleca | |
| 2007/0238343 A1 | 10/2007 | Velleca et al. | |
| 2007/0243725 A1 | 10/2007 | Nordin et al. | |
| 2008/0122579 A1 | 5/2008 | German et al. | |
| 2009/0096581 A1 | 4/2009 | Macauley et al. | |
| 2010/0267274 A1* | 10/2010 | McNally et al. | 439/488 |
| 2013/0064249 A1 | 3/2013 | Shar et al. | |
| 2013/0095694 A1 | 4/2013 | Shifris et al. | |

FOREIGN PATENT DOCUMENTS

| | | |
|---|---|---|
| CN | 101142826 A | 3/2008 |
| GB | 2347751 A | 9/2000 |
| GB | 2 375 898 A | 11/2002 |
| WO | WO 2005/018150 A1 | 2/2005 |
| WO | WO 2009/052381 A2 | 4/2009 |

OTHER PUBLICATIONS

International Preliminary Report on Patentability Corresponding to International Application No. PCT/US2010/045988; Date of Mailing: Mar. 1, 2012; 5 pages.
Notification of Transmittal of the International Search Report and the Written Opinion of the International Searching Authority, or the Declaration; International Search Report; Written Opinion of the International Searching Authority corresponding International Application No. PCT/US2010/045988; Date of mailing: Dec. 6, 2010; 8 pages.
Notification of Transmittal of the International Search Report and the Written Opinion of the International Searching Authority, or the Declaration; International Search Report; Written Opinion of the International Searching Authority corresponding International Application No. PCT/US2010/046132; Date of mailing: Dec. 27, 2010; 10 pages.
Dallas Semiconductor Maxim, Application Note 186, "Creating Global Identifiers Using 1-Wire® Devices," Jun. 14, 2002.
Dallas Semiconductor Maxim, Application No. 148, "Guidelines for Reliable Long Line 1-Wire® Networks," Sep. 22, 2008.
Dallas Semiconductor Maxim, Application Note 1796, "Overview of 1-Wire® Technology and Its Use," Jun. 19, 2008.
1-Wire, Wikipedia, http://en.wikipedia.org/wiki/w-wire, accessed May 8, 2009.
Pending Patent Application entitled Systems for Automatically Tracking Patching Connections to Network Devices Using a Separate Channel and Related Patching Equipment and Methods, filed Aug. 21, 2009, U.S. Appl. No. 12/545,096.
Patent Examination Report No., from corresponding Australian Patent Application No. 2010284185, issued Apr. 29, 2014, 4 pages.
Chinese Second Office Action Corresponding to Chinese Patent Application No. 201080047733; Date of Issue: Feb. 27, 2015; Foreign Text, 9 Pages, English Translation Thereof, 15 Pages.
English Translation of First Office Action, from corresponding Chinese Patent Application No. 201080048176.4, issued May 23, 2014, 2 pages.
First Office Action, from corresponding Chinese Patent Application No. 201080047733.0, issued Jun. 4, 2014, 7 pages (Chinese language only).
European Patent Office, Office Action for EP Patent Application No. 10748024.6-1851, from Foreign Counterpart of U.S. Appl. No. 12/787,486, Aug. 26, 2016, pp. 1-4, Published in: EP.

* cited by examiner

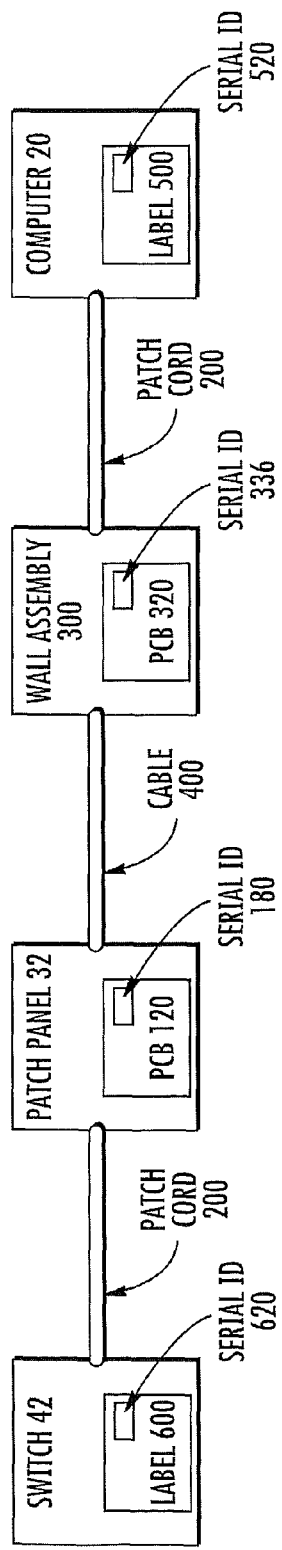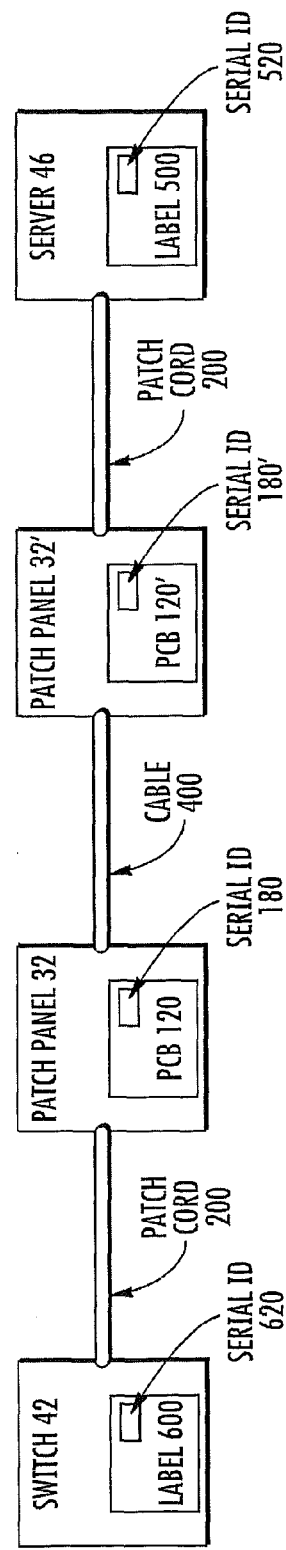

SYSTEMS, EQUIPMENT AND METHODS FOR AUTOMATICALLY TRACKING CABLE CONNECTIONS AND FOR IDENTIFYING WORK AREA DEVICES AND RELATED METHODS OF OPERATING COMMUNICATIONS NETWORKS

CROSS-REFERENCE TO PRIORITY APPLICATION

This application claims priority as a continuation-in-part of U.S. patent application Ser. No. 12/545,096, filed Aug. 21, 2009, the entire content of which is incorporated by reference herein as if set forth in its entirety.

FIELD OF THE INVENTION

The present invention relates generally to communications patching systems and, more particularly, to systems, equipment and methods for automatically tracking connections in communications networks.

BACKGROUND

Many businesses have dedicated communications systems that enable computers, servers, printers, facsimile machines and the like to communicate with each other, through a private network, and with remote locations via a telecommunications service provider. Such communications system may be hard wired through, for example, the walls and/or ceilings of a building using communications cables. Typically, these cables contain eight insulated copper wires that are arranged as four differential twisted pairs of wires that may be used to transmit four separate differential signals, although in some cases fiber optic communications cables may be used instead. Individual connector ports such as RJ-45 style modular wall jacks are mounted in offices throughout the building. The cables provide a communications path from the connector ports in offices and other rooms, hallways and common areas of the building (referred to herein as "work area outlets") to network equipment (e.g., network servers, switches, etc.) that may be located in a computer room. Communications cables from external telecommunication service providers may also terminate within the computer room.

Commercial data center operations also use hard wired communications systems to interconnect hundreds or thousands of servers, routers, memory storage systems and other associated equipment. In these data centers, fiber optic communications cables and/or communications cables that include four differential pairs of insulated copper wires are used to interconnect the servers, routers, memory storage systems and the like.

In both office networks and data center operations, the cables that are connected to end devices may terminate into one or more communications patching systems that may simplify later connectivity changes. Typically, a communications patching system includes a plurality of "patch panels" that are mounted on one or more equipment racks. As is known to those of skill in the art, a "patch panel" refers to an inter-connection device that includes a plurality of connector ports on a front side thereof. Each connector port (e.g., an RJ-45 jack or a fiber optic adapter) is configured to receive a first communications cable that is terminated with a mating connector (e.g., an RJ-45 plug or a fiber optic cable termination). A second cable is terminated into the reverse side of each connector port. With respect to RJ-45 patch panels, the second cable is typically terminated into the reverse side of the patch panel by terminating the eight (or more) conductive wires of the cable into corresponding insulation displacement contacts or other wire connection terminals of the connector port. With respect to fiber optic patch panels, the second cable is typically terminated into the reverse side of the patch panel by inserting a mating connector that terminates the second fiber optic cable into the reverse side of the fiber optic adapter. Herein, a "patch cord" refers to a communications cable that has at least one end which is terminated with a connector (e.g., an RJ-45 plug or a fiber optic cable termination). Each connector port on the patch panel may provide one or more communications paths between a first cable that is plugged into the front side of the connector port and a second cable that is terminated into the reverse side of the connector port. The patching system may optionally include a variety of additional equipment such as rack managers, system managers and other devices that facilitate making and/or tracking patching connections.

The patch cords in communications patching systems may be rearranged frequently. The patch cord interconnections are typically logged in a computer-based log that records changes made to the patch cord connections. The communications cable connections between patch panel ports and work area modular wall jacks are typically determined manually and recorded in the computer-based log. Thus, the computer-based log, if properly maintained, may keep of the end-to-end connections between work area wall jacks and the connector ports on network switches. However, technicians may neglect to update the log each and every time a change is made, and/or may make errors in logging changes. As such, the logs may not be completely accurate.

A variety of systems have been proposed for automatically logging the patch cord connections in a communications patching system, including techniques that use mechanical switches, radio frequency identification and the like. These patching systems typically use special "intelligent" patch panels and management hardware and/or software to detect patch cord insertions/removals at the patch panels and/or to read identifiers located on the patch cords or connector ports to facilitate automatic tracking of the patching connections. Typically, these systems require that all of the patch panels in the communications patching field have these automatic tracking capabilities. However, the available systems generally have one or more shortcomings.

SUMMARY

According to certain embodiments of the present invention, methods are provided for collecting information regarding a remote connector port that is connected to a patch panel connector port by a communications cable that has at least one data communications channel and a separate control channel. Pursuant to these methods, a first conductor of the separate control channel of the communications cable is biased to power an integrated circuit chip that is associated with the remote connector port. A first signal is transmitted over the separate control channel of the communications cable to the integrated circuit chip. A second signal is received from the integrated circuit chip over the separate control channel of the communications cable in response to the first signal. The second signal includes information regarding the remote connector port.

In some embodiments, the remote connector port may be a work area outlet such as, for example, a modular wall jack. In other embodiments, the remote connector port may be a connector port on a second patch panel. In some embodiments, the separate control channel may include a first conductor that is a signal carrying conductor and a second conductor that is a ground conductor. In some embodiments, the integrated circuit chip may be a serial ID chip. The data communications channel may comprise, for example, at least one optical fiber or four differential pairs of insulated conductors.

In some embodiments, the remote connector port may include first and second contact pads mounted adjacent a plug aperture of the remote connector port, and the integrated circuit chip may be electrically connected to first and second conductors of the separate control channel via the first and second contact pads. The information regarding the remote connector port may include a location of the remote connector port.

According to further embodiments of the present invention, systems for tracking a communications cable connection are provided. These systems include a patch panel having a first connector port and a work area outlet that includes a second connector port and an associated integrated circuit chip. These systems further include a communications cable that extends between the first and second connector ports. The communications cable has at least one data communications channel and a separate control channel. A microprocessor that is associated with the first patch panel is in communication with the integrated circuit chip over the separate control channel.

In some embodiments, the separate control channel may be a first conductor that is coupled to a signal output of the microprocessor and a second conductor that is coupled to ground. The integrated circuit chip may be a serial ID chip, and the at least one data communications channel may comprise four differential pairs of insulated conductors.

According to still further embodiments of the present invention, methods of automatically identifying an end device that is connected to a local area network are provided. Pursuant to these methods, a first control signal is transmitted over a control channel that runs from a first connector port on a patch panel to an integrated circuit chip mounted on the end device through at least a communications cable, a second connector port and a patch cord. In response to this signal, a second control signal is received from the integrated circuit chip over the control channel. The second control signal includes identifying information for the end device.

In some embodiments, the integrated circuit chip may be a first serial ID chip, and the identifying information may be a MAC ID. The second connector port may include a second serial ID chip that is electrically connected to the control channel. The second connector port may also include a sensor that is configured to detect when a patch cord is plugged into the second connector port. In such embodiments, the first control signal may be transmitted in response to determining that the patch cord was plugged into the second connector port. These methods may further include a step of powering the integrated circuit chip by a first conductive path of the control channel to a voltage sufficient to operate the integrated circuit chip. The integrated circuit chip may be part of a passive electronic label that is mounted adjacent a third connector port that is included on the end device.

According to still further embodiments of the present invention, intelligent connector port assemblies are provided that include a connector port having a plug aperture. This connector port is configured to electrically connect a data communications channel of a patch cord that is connected to input contacts of the connector port to a data communications channel of a communications cable that is connected to output contacts of the connector port. The assembly further includes an integrated circuit chip, a first pair of contacts that are mounted adjacent the plug aperture that are configured to mate with a pair of contacts on the patch cord when the patch cord is received within the plug aperture, and a second pair of contacts that are configured to mate with a pair of conductors in the communications cable that form a control channel. At least a first contact of the first pair of contacts and a first contact of the second pair of contacts are electrically connected to the integrated circuit chip.

In some embodiments, the assembly further includes a first printed circuit board, and the first pair of contacts is mounted on the first printed circuit board. The first pair of contacts may comprise, for example, a pair of contact pads. The assembly may also include a second printed circuit board and a pair of connection contacts. In such embodiments, the second pair of contacts may be mounted on the second printed circuit board, and the connection contacts electrically connect the first and second printed circuit boards. In some embodiments, the second pair of contacts may be a pair of insulation displacement contacts, and/or the integrated circuit chip may be a serial ID chip that is powered by a voltage received through a first of the second pair of contacts. A second of the second pair of contacts may receive a ground signal.

The connector port may be, for example, an RJ-45 jack having a termination cap. In some embodiments, this termination cap may include a pair of spring loaded pins that are configured to engage respective ones of the second pair of contacts when the termination cap is mounted on a back-end wire connection assembly of the RJ-45 jack. In other embodiments, the termination cap may include a conductor routing assembly for routing the pair of conductors in the communications cable that form the control channel to the second pair of contacts.

In some embodiments, the assembly may further include an LED that is mounted on the first printed circuit board and that is electrically connected to the pair of conductors in the communications cable that form the control channel via the second pair of contacts. The assembly may also include a spring-loaded shutter that is mounted to cover the plug aperture, the shutter including a contact that mates with a shutter contact on the first printed circuit board when the shutter is in its closed position. In such embodiments, the shutter contact may be configured to act as a sensor for determining if a patch cord is plugged into the plug aperture.

According to additional embodiments of the present invention, methods for automatically provisioning services to a connector port on a network switch are provided. Pursuant to these methods, an end device that is connected to the network switch is identified using a control channel that extends through one or more communications cables and patch cords that connect the connector port on the network switch to the end device. In response to this identification. a service that should be provided to the end device may be automatically identified. Then, the identified service may be automatically provisioned to the connector port on the network switch. In some embodiments, these methods may further include the steps of determining if the identified end device is authorized access to the network switch and enabling the connector port on the network switch in response to determining that the identified device is authorized access.

According to still further embodiments of the present invention, methods for enabling a connector port on a network switch are provided. Pursuant to these methods, an end device that is electrically connected to the network switch is identified using a control channel that extends through one or more communications cables and patch cords that connect the connector port on the network switch to the end device. It may then be automatically determining if the identified end device is authorized access to the network switch. If it is determined that the identified end device is authorized access to the network switch, then the connector port on the network switch may be automatically enabled.

According to yet additional embodiments of the present invention, passive electronically readable labels are provided that are configured to be installed on a device that includes a first connector port and a second connector port. These labels may include a printed circuit board, an integrated circuit chip mounted on the printed circuit board, a first pair of contacts mounted on the printed circuit board adjacent to the first connector port, and a second pair of contacts mounted on the printed circuit board adjacent to the second connector port. A unique identifier that is associated with the connector port may be stored within the integrated circuit chip. A first contact of the first pair of contacts is electrically connected to the integrated circuit chip. The first contact of the first pair of contacts is electrically connected to a first contact of the second pair of contacts, and a second contact of the first pair of contacts is electrically connected to a second contact of the second pair of contacts.

In some embodiments, the printed circuit board may be electrically isolated from the device, and/or the integrated circuit chip may be a serial ID chip. The label may further include an adhesive layer for mounting the label on the device. The serial ID chip and the adhesive layer may both be mounted on the back side of the printed circuit board. This may help protect the serial ID chip from accidental damage, and may reduce the number of components contained on the front side of the printed circuit board.

According to still further embodiments of the present invention, RJ-45 connector port assemblies are provided that include a communications cable having first through tenth conductors, an RJ-45 jack that includes first through eighth wire connection terminals that are mounted on a first printed circuit board that receive respective of the first through eighth conductors, and a second printed circuit board that includes ninth and tenth wire connection terminals that receive the ninth and tenth conductors, respectively. The ninth and tenth wire connection terminals may be, for example, contact pads or insulation displacement contacts. The ninth and tenth conductors may have diameters that differ from the diameters of the first through eighth conductors. In particular, in some embodiments, the ninth and tenth conductors may be smaller than the first through eighth conductors. It will also be appreciated that some or all of the first through tenth wires may have non-circular transverse cross sections.

Pursuant to still further embodiments of the present invention, methods of automatically identifying an end device that is connected to a local area network are provided. Pursuant to these methods, a first control signal is transmitted over a control channel that runs from a first connector port on a patch panel of the local area network to an integrated circuit chip mounted on the end device through at least a communications cable, a second connector port and a patch cord. A second control signal is received from the integrated circuit chip over the control channel in response to the first signal. The second signal includes identifying information for the end device. In some embodiments the method is carried out during a time period where the end device is not powered on.

Pursuant to additional further embodiments of the present invention, methods for testing a wall jack assembly of a communications system are provided in which a handheld test device is used to test at least one communication path between the wall jack assembly and a computer room. The handheld test device is further used to program location information into an integrated circuit chip of the wall jack assembly. In some embodiments, the handheld test device may include first and second contacts that are configured to mate with corresponding contacts of the wall jack assembly that are electrically connected to a serial ID chip.

Pursuant to still further embodiments of the present invention, methods of tracking horizontal cable connections in a communications system are provided. Pursuant to these methods, the connections between the connector ports of a plurality of network switches of the communications system and a plurality of modular wall jacks are automatically identified, and then the identified connections are stored in a memory. These methods may also include automatically identifying at least some end devices that are connected by patch cords to respective ones of the plurality of modular wall jacks.

Pursuant to still further embodiments of the present invention, methods of automatically discovering backbone cabling connections between a first patch panel and a second patch panel are provided. Pursuant to these methods, a first control signal is transmitted over a control channel that runs through a first backbone cable from a first connector port on the first patch panel to an integrated circuit chip that is associated with a first connector port on the second patch panel. A second control signal is received from the integrated circuit chip over the control channel in response to the first signal. This second signal includes identifying information for the first connector port on the second patch panel.

In some embodiments, the integrated circuit chip may be a serial ID chip. The method may also include logging information regarding the connection between the first connector port on the first patch panel and the first connector port on the second patch panel in a connectivity database. The method may also include transmitting additional control signals over respective ones of a plurality of additional control channels that are associated with respective ones of a plurality of additional connector ports on the first patch panel, and receiving responsive control signals over at least some of the control channels that include identifying information for connector ports on other patch panels that are connected by backbone cables to respective ones of the connector ports on the first patch panel. These methods may be carried out prior to any of the connector ports on the first patch panel being connected to other devices using patch cords.

BRIEF DESCRIPTION OF THE DRAWINGS

FIGS. 21A-21D are schematic block diagrams illustrating the communications links included in patching systems according to various embodiments of the present invention.

DETAILED DESCRIPTION

The present invention now is described more fully hereinafter with reference to the accompanying drawings, in which certain embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Embodiments of the present invention are described below with reference to flowchart illustrations. It will be understood that some blocks of the flowchart illustrations may be combined or split into multiple blocks, and that the blocks in the flow chart diagrams need not necessarily be performed in the order illustrated in the flow charts.

Pursuant to embodiments of the present invention, communications systems are provided which use, for example, serial ID chips to allow intelligent tracking of patching and cabling connections within a communications network. These serial ID chips may be mounted on patch panels, network devices (e.g., switches, routers, servers), work area outlets and on work area end devices (e.g., computers, printers, facsimile machines, internet telephones). As discussed in detail below, the communications patching systems according to embodiments of the present invention can automatically (1) track patching connections between patch panels and network switches, (2) monitor connectivity of horizontal cabling to work area outlets, (3) track the end devices that are connected to work area outlets and (4) track the end devices that are connected to network switches. Moreover, the types and/or identities of the end devices may be tracked regardless of whether or not the end devices are powered on.

Figure 1:
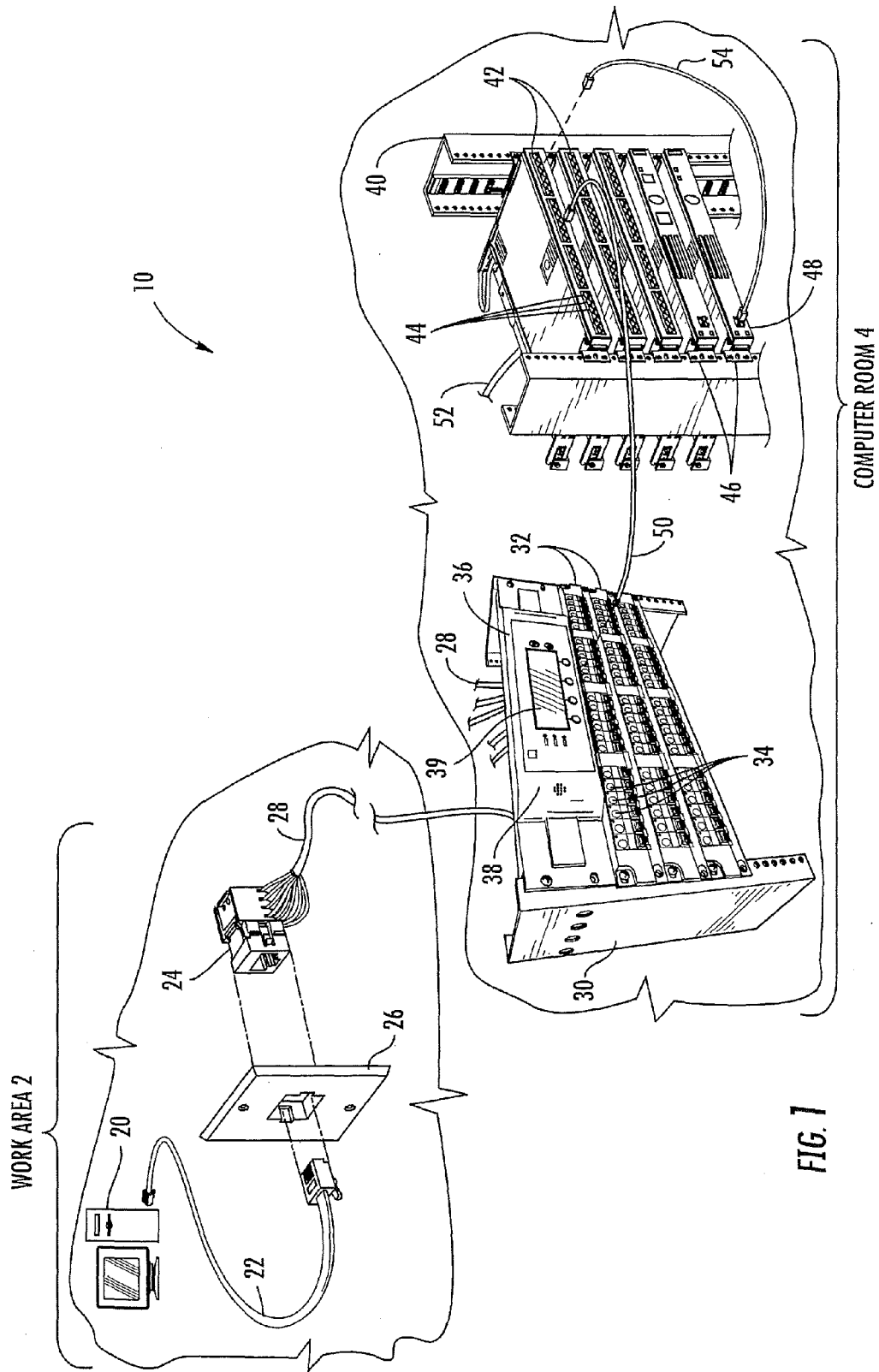
FIG. 1 is a schematic view of an inter-connect communications patching system according to embodiments of the present invention.

FIG. 1 is a schematic view of an inter-connect communications system 10 according to certain embodiments of the present invention that may be used to connect computers, printers, Internet telephones and other end devices that are located in work areas throughout a building to network equipment that is located, for example, in a computer room of the building. As shown in FIG. 1, a computer 20 or other end device is located in a work area 2 of a building. The computer 20 is connected by a patch cord 22 to a modular wall jack 24 that is mounted in a wall plate 26 in work area 2. A communications cable 28 is routed from the back end of the wall jack 24 through, for example, the walls and/or ceiling of the building, to the computer room 4. As there may be hundreds or thousands of work area wall jacks 24 in an office building, a large number of cables 28 may be routed into the computer room 4.

A first equipment rack 30 is provided in the computer room 4. A plurality of patch panels 32 are mounted on the first equipment rack 30. Each patch panel 32 includes a plurality of connector ports 34. Each cable 28 is terminated onto the back end of one of the connector ports 34 of one of the patch panels 32. In FIG. 1, each connector port 34 comprises an RJ-45 jack. However, it will be appreciated that other types of connector ports may be used such as, for example, LC, SC, MPO or other fiber optic adapters.

A rack controller 36 is also mounted on the equipment rack 30. The rack controller 36 includes a central processing unit ("CPU") 38 and a display 39. In larger communications patching systems that include multiple equipments racks that are filled with patch panels (only a single such rack 30 is depicted in FIG. 1), the rack controller 36 may be interconnected with rack controllers (not shown in FIG. 1) that are provided on the other patch panel equipment racks so that the rack controllers can communicate in a common network as if they were a single controller. The CPU 38 of rack controller 36 may be capable of independently running line tracing programs as described below and may also include a remote access port that enables the CPU 38 to be accessed by a remote computer such as, for example, a system administrator computer (not shown in FIG. 1). The rack controller 36 may, for example, operate and gather data from intelligent tracking capabilities of the patch panels 32, as will be explained herein.

As is further shown in FIG. 1, network devices such as, for example, one or more network switches 42 and network routers and/or servers 46 are mounted, for example, on a second equipment rack 40. Each of the switches 42 may include a plurality of connector ports 44, and each network router and/or server 46 may include one or more connector ports 48. One or more external communications lines 52 are connected to at least some of the network devices 46 (either directly or through a patch panel). A first set of patch cords 50 connect the connector ports 44 on the switches 42 to respective ones of the connector ports 34 on the patch panels 32. A second set of patch cords 54 may be used to interconnect other of the connector ports 44 on the switches 42 with connector ports 48 provided on the network routers/servers 46. In order to simplify FIG. 1, only a single patch cord 50 and a single patch cord 54 are shown. The communications patching system of FIG. 1 may be used to connect each work area computer 20 or other device to the network switches 42, the network switches 42 to the network routers and servers 46, and the network routers/servers 46 to external communications lines 52, thereby establishing the physical connectivity required to give devices 20 access to both local and wide area networks.

The communications system 10 of FIG. 1 may be used to automatically determine and/or confirm patching connections all the way from end devices in the work areas 2 such as computer 20 to end devices in the computer room 4 such as network router 46. This automatic tracking may be accomplished by mounting serial ID chips on work area end devices 20, work area wall jacks 24, intelligent patch panels 32 and/or network equipment 42/46 and, by using special communications cables 28 and patch cords 22, 50, 54 that include both data communications channels as well as a separate control channel that may be used to communicate with the serial ID chips.

As known to those of skill in the art, a serial ID chip is an integrated circuit ("IC") chip that is pre-programmed (either during manufacture or later by a user or purchaser of the chip) with a unique identifier and/or other information. These serial ID chips are configured to transmit a signal that includes some or all of the information programmed therein (e.g., the unique identifier) in response to receipt of a signal from a master device such as, for example, a microprocessor. The unique identifier may be any information that serves to identify a particular device and/or a port thereon. For example, in some embodiments, for the work area end devices 20 and/or the network equipment such as the network switches 42 and the routers/servers 46, the unique identifier could be a serial number or a MAC ID of each device. For patch panels, the unique identifier could be, for example, the serial number or MAC ID of the patch panel combined with a port number that identifies a specific port of the patch panel that the serial ID chip is associated with. For wall jacks, the unique identifier could be, for example, a location and an outlet number (e.g., office 327, jack number 2). It will be appreciated that a wide variety of other information could be used as the unique identifier. Exemplary serial ID chips include, for example, 1-Wire® chips available from Maxim Integrated Products (formerly Dallas Semiconductor Corp.). In some embodiments, the serial ID chips may have two input/output pins, namely a first pin that carries signals that are transmitted to and from the serial ID chip and a second pin that carries a ground signal to the serial ID chip. The first pin may also be used to provide an operating voltage that powers the serial ID chip.

Figure 2:
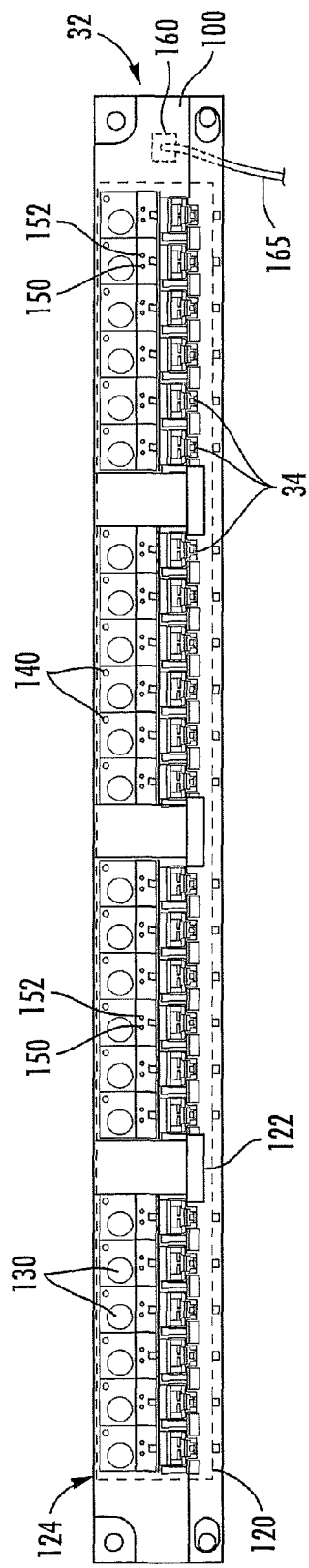
FIG. 2 is a front view of one of the intelligent patch panels of the communications patching system of FIG. 1.
Figure 3:
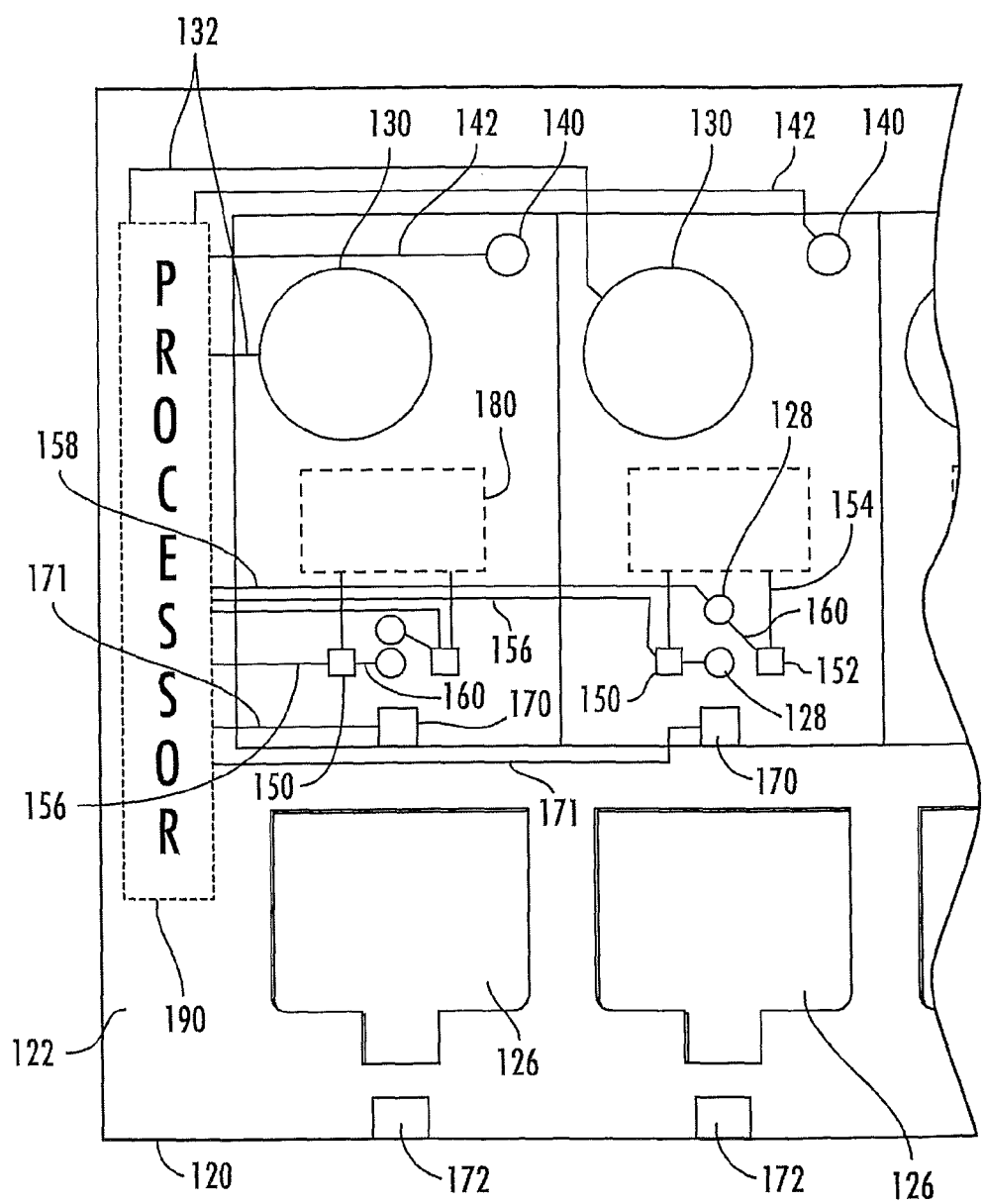
FIG. 3 is a schematic front view of a portion of the front printed circuit board of the intelligent patch panel of FIG. 2.
Figure 4:
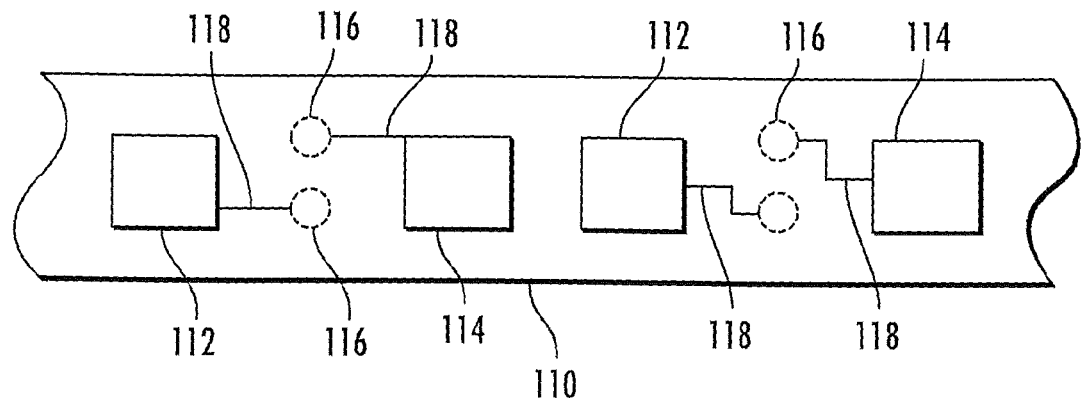
FIG. 4 is a schematic plan view of a portion of the rear printed circuit board of the intelligent patch panel of FIG. 2.
Figure 5:
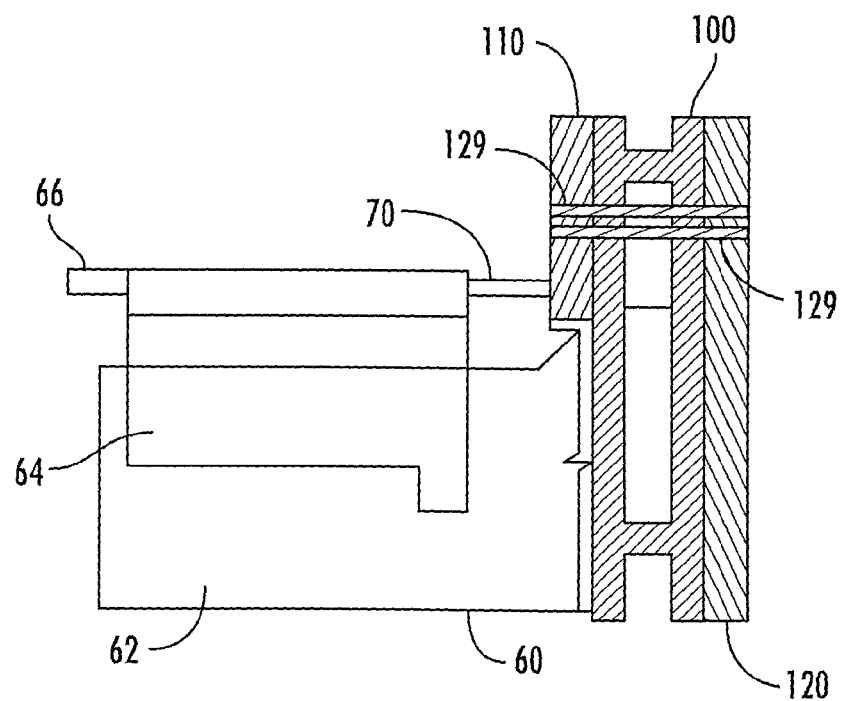
FIG. 5 is a schematic side view of the intelligent patch panel of FIG. 2.

FIGS. 2-5 illustrate one of the patch panels 32 of FIG. 1 in further detail. In particular, FIG. 2 is an enlarged front view of the patch panel 32. FIG. 3 is a schematic front view of a portion of the front printed circuit board 120 of patch panel 32. FIG. 4 is a schematic plan view of a small portion of the rear printed circuit board 110 of patch panel 32. Finally, FIG. 5 is a schematic side view of patch panel 32 that illustrates how the front printed circuit board 120 connects to the rear printed circuit board 110. FIGS. 2-5 illustrate the electrical connections and circuit elements of the patch panel 32 that may be used to automatically track patching connections between (1) the patch panels 32 and the switches 42 of FIG. 1 and (2) the patch panels 32 and the modular wall jack assemblies 24 of FIG. 1.

As shown in FIG. 2, the exemplary patch panel 32 includes a mounting frame 100 and twenty-four connector ports 34 that are, in this embodiment, arranged as four groups of six connector ports 34. A front printed circuit board 120 is mounted on the front face of the mounting frame 100 and includes cut-out areas for each of the connector ports 34. A front side 122 of the front printed circuit board 120 faces forwardly and a back side 124 of the front printed circuit board 120 abuts the front face of the mounting frame 100. The front printed circuit board 120 is shown in outline representation in FIG. 2 as it may be partly or completely hidden beneath a cover or other protective or aesthetic housing. Trace buttons 130 and light emitting diodes ("LED") 140 are mounted on the front side 122 of the front printed circuit board 120 adjacent each of the connector ports 34. Operation of the trace buttons 130 and the LEDs 140 is discussed in detail below.

As is also shown in FIG. 2, a pair of contact pads 150, 152 is provided on the front side 122 of the front printed circuit board 120 adjacent to each connector port 34. While each pair of contact pads 150, 152 is mounted directly above each connector port 34, it will be appreciated that the contact pads 150, 152 may be positioned in different locations (e.g., below the connector ports 34). It will also be appreciated that, in further embodiments, contact structures other than contact pads may be used such as, for example, contact pins, contact springs, etc. The patch panel 32 further includes a connection 160 that receives one end of a communications cable 165 (e.g., a ribbon cable, an RJ-45 patch cord, etc.). The other end of the communications cable 165 may be connected directly or indirectly to, for example, the rack manager 36 (see FIG. 1). This communications cable 165 provides a communications path that allows information to be communicated to and from the components that are mounted on the front printed circuit board 120 and/or the rear printed circuit board 110 of patch panel 32 and the rack controller 36.

FIG. 3 is an enlarged schematic front view of a portion of the front printed circuit board 120 of the intelligent patch panel 32 of FIGS. 1-2. The front printed circuit board 120 may be generally rectangular in shape, and may include a plurality of cut-out areas 126. These cut-out areas 126 each provide access to a respective one of the connector ports 34 of the patch panel 32 (which, in the particular embodiment of FIG. 3 are RJ-45 style jacks). These cut-out areas 126 are also referred to herein as connector port openings 126.

As shown in FIG. 3, the trace buttons 130 and the LEDs 140 are mounted on the front side 122 of the front printed circuit board 120, with each trace button 130 and LED 140 being positioned above a respective one of the connector port openings 126. The front printed circuit board 120 also includes a plurality of detectors 170 that, in this particular embodiment, are located directly above each of the connector port openings 126. As with the trace buttons 130 and LEDs 140, one detector 170 is provided for each connector port 34. A plurality of emitters 172 are likewise provided on the front side 122 of front printed circuit board 120, with each emitter 172 located below a respective one of the connector port openings 126.

A plurality of serial ID chips 180 are mounted, for example, on the back side 124 of the printed circuit board 120 (and hence are shown using dotted lines). In the depicted embodiment, a serial ID chip 180 is provided for each connector port 34. However, it will be appreciated that, in other embodiments, each serial ID chip 180 may be associated with multiple of the connector ports 34. Additionally, a microprocessor 190 may also be mounted on, for example, the back side 124 of the front printed circuit board 120 (and hence is also shown using dotted lines). Each detector 170 may be connected to the microprocessor 190 by respective ones of a first set of printed circuit board traces 171. Additionally, as noted above, a pair of contact pads 150, 152 are positioned just above each of the connector port openings 126. A second set of printed circuit board traces 154 connect each of the contact pads 150 or 152 to respective ones of the two pins that are provided on each of the serial ID chips 180. These traces 154 thus place each pair of contact pads 150, 152 into electrical communication with a respective one of the serial ID chips 180. A third set of printed circuit board traces 156 is provided that each connect one of the contact pads 150 to an input/output port on the microprocessor 190. A fourth set of printed circuit board traces 158 is provided that each connect one of the contact pads 152 to a ground reference on the microprocessor 190 (or elsewhere on the front printed circuit board 120). Finally, power connections and ground references (not shown in FIG. 3) may be provided to each of the detectors 170 and emitters 172, and to the microprocessor 190. Printed circuit board traces (not shown in FIG. 3) are also provided on front printed circuit board 120 that electrically connect each of the trace buttons 130 and each of the LEDs 140 to the microprocessor 190. Finally, a pair of metal-plated apertures 128 are provided above each connector port opening 126 that are electrically connected to the contact pads 150, 152 by a fifth set of printed circuit board traces 160. As will be discussed in more detail below, each of these apertures 128 may receive a connection contact 129 that electrically connects the contact pads 150, 152 to a respective set of contact pads 112, 114 that are mounted on a rear printed circuit board 110.

FIG. 4 is a schematic plan view of a small portion of the rear printed circuit board 110 (namely the portion above two of the connector ports 34). This rear printed circuit board 110 may be mounted on the back side of mounting frame 100. As shown in FIG. 4, the rear printed circuit board 110 includes a plurality of pairs of contact pads 112, 114 that may be mounted, for example, above each of the connector ports 34. The rear printed circuit board 110 further includes pairs of metal-plated apertures 116 that are associated with each connector port 34 on the patch panel 32. Each metal-plated aperture 116 receives a respective one of two connection contacts 129 (see FIG. 5) that are used to electrically connect the contact pads 150, 152 on front printed circuit board 120 that are associated with each connector port 34 with the corresponding contact pads 112, 114 on rear printed circuit board 110. Printed circuit board traces 118 are provided that electrically connect the metal-plated apertures 116 to the first and second contact pads 112, 114.

FIG. 5 is a schematic side cross-sectional view of patch panel 32 that illustrates how the connection contacts 129 electrically connect the front printed circuit board 120 to the rear printed circuit board 110. As shown in FIG. 5, the connection contacts 129 may comprise metal bars that extend between the rear printed circuit board 110 and the front printed circuit board 120. In some embodiments, these metal bars may have eye-of-the needle terminations on each end thereof to facilitate mounting the connection contacts 129 in the metal-plated apertures 116, 128. As is apparent from FIGS. 3-5, the connection contacts 129 (along with printed circuit board traces 118, 156, 158 and 160) provide a communications path between the microprocessor 190 and the contact pads 112, 114 on rear printed circuit board 110. This communications path allows the microprocessor 190 to transmit control signals to conductors on a cable that is terminated into the rear of connector port 34, as will be described in more detail below.

As is further shown in FIG. 5, each connector port 34 may comprise, for example, an RJ-45 jack 60. The jack 60 may include a housing 62 and a jack printed circuit board (not visible in the figures) that has a plurality of jackwire contacts (not visible in the figures) and insulation displacement contacts ("IDCs") (not visible in the figures) mounted thereon. Each jackwire contact may be electrically connected to a respective one of the IDCs by conductive traces on the jack printed circuit board. The jack 60 may further include a punch-down cover 64, which may comprise a plastic cover piece that is mounted on top of the jack housing 62. The punch-down cover 64 includes first and second wire terminations 66, 68 (only termination 66 is visible in FIG. 5) that are each used to receive a respective one of two extra conductors that are included in a cable that is terminated onto the back end of jack 60, as will be discussed in more detail herein. The wire terminations 66, 68 may be crimped wire terminations that are permanently crimped onto respective ones of these two extra conductors using a special tool. The punch-down cover 64 may further include first and second spring loaded pins 70, 72 (only pin 70 is visible in FIG. 5) which are electrically connected to the first and second wire terminations 66, 68, respectively. The first and second spring loaded pins 70, 72 may be configured to mate with the first and second contact pads 112, 114 on the rear printed circuit board 110 when the punch-down cover 64 is installed on the IDC housing 62, thereby providing an electrical path that connects the two extra conductors in the cable that is attached to jack 60 to the rear printed circuit board 110.

The operation of each of the components of front printed circuit board 120 and the rear printed circuit board 110 will now be discussed in further detail.

The detectors 170 and emitters 172 on the front printed circuit board 120 may be used to detect when patch cords are inserted into and/or removed from the various connector ports 34 on the patch panel 32. In the depicted embodiment, each detector 170 comprises an infrared detector that is mounted on the front printed circuit board 120 just above its associated connector port 34, and each emitter 172 comprises an infrared emitter that is mounted on the front printed circuit board 120 just below its associated connector port 34. Thus, the infrared detectors 170 and the infrared emitters 172 may be arranged in pairs, with each infrared detector 170 mounted directly opposite its respective infrared emitter 172 and positioned to receive the infrared beam emitted by its paired infrared emitter 172. The infrared detectors 170 and infrared emitters 172 may be used as follows to detect the insertion and/or removal of patch cords in communications patching systems in which the patch panel 32 is used.

As a plug that is on one end of a patch cord (e.g., one of the patch cords 50 of FIG. 1) is received within one of the connector ports 34 on the patch panel 32 (see FIG. 2), the plug blocks the infrared beam that is emitted by the infrared emitter 172 that is associated with the connector port 34 that receives the plug. Once the infrared beam is blocked by the plug, the infrared detector 170 on the printed circuit board 120 that is positioned on the opposite side of the connector port 34 from the infrared emitter 172 no longer detects the infrared beam. As noted above, the microprocessor 190 is electrically connected to each of the infrared detectors 170 by a printed circuit board trace 171, and via this connection monitors the state of an output of each of the infrared detectors 170 that indicates whether or not the infrared detector 170 is receiving an infrared beam. When the microprocessor 190 determines that one of the infrared detectors 170 is no longer detecting an infrared beam, the microprocessor 190 recognizes this as indicating that a patch cord has been received in the connector port 34 that the particular infrared detector 170 is associated with. Likewise, when a patch cord (e.g., one of the patch cords 50 of FIG. 1) is removed from one of the connector ports 34, the infrared detector 170 that is associated with the connector port 34 will again detect the infrared beam emitted by its corresponding infrared emitter 172. Once again, this information is sensed by the microprocessor 190, which recognizes the information as indicating that a patch cord has been removed from the connector port 34 that the particular infrared detector 170 is associated with. In this manner the microprocessor 190 may detect (and record in, for example, a database) each instance where a patch cord is inserted into, or removed from, any of the connector ports 34 on the patch panel 32 by monitoring the status of each infrared detector 170.

While the particular embodiment of the patch panel 32 depicted in FIGS. 2 and 3 includes a microprocessor 190 that tracks the insertions and deletions of patch cords from each of the connector ports 34, it will be appreciated that, in other embodiments, the microprocessor 190 could be omitted and/or another processing device could instead be used to track the patch cord insertions and deletions. For example, in further embodiments of the present invention, the output of each of the infrared detectors 170 could be passed via the connection 160 and the communications cable 165 to, for example, the CPU 38 of the rack manager 36 which may be used instead to perform the functionality of the microprocessor 190.

Likewise, while the intelligent patch panel 32 depicted in FIG. 2 uses infrared emitters 172 and infrared detectors 170 to detect the insertion and removal of patch cords, it will be appreciated that other types of sensing devices may be used. By way of example, in further embodiments of the present invention, each pair of infrared emitters 172 and infrared detectors 170 on front printed circuit board 120 may be replaced with a single infrared emitter/detector that emits an infrared signal and then detects infrared energy that may be reflected back to the emitter/detector when a patch plug is inserted within the connector port 34. Hence, when such infrared emitter/detectors are used, the absence of any detection of an infrared signal indicates that the associated connector port 34 is not in use, and the detection of reflected infrared energy occurs once a patch cord is plugged into the connector port 34 at issue. The use of the infrared emitter/detector may allow for use of smaller printed circuit boards that only extend above (or below) the connector ports 34 on patch panel 32, as they remove any need for having an emitter and a detector on opposite sides of each connector port 34. In still further embodiments, each pair of infrared emitters 172 and infrared detectors 170 may be replaced by optical emitters and detectors, magnetic detectors, mechanical or electromechanical switches or the like that are triggered when plugs are inserted into, or removed from, the connector ports 34.

As noted above, the front printed circuit board 120 further includes a trace button 130 and an LED 140 for each connector port opening 126. Each trace button 130 is connected to the microprocessor 190 by a conductive trace 132 on the front printed circuit board 120, and each LED 140 is connected to the microprocessor 190 by a conductive trace 142 on the printed circuit board 120. As will be discussed in more detail below, the trace buttons 130 and LEDs 140 may be used to allow a technician to easily identify the connector ports that are connected by communications cables 28 or patch cords 50 to each of the connector ports 34 on the patch panel 32. It will be appreciated that, in some embodiments, various components such as, for example, the trace buttons 130 and/or the LEDs 140, may be omitted.

As noted above, a plurality of serial ID chips 180 (shown using dotted lines) are mounted on the reverse side 124 of the front printed circuit board 120. As will be discussed in more detail below, the serial ID chips 180 may be used to automatically gather patch cord connectivity information. In particular, patch cords that include a separate control channel may be used to communicate with the serial ID chips 180. Herein, the term "control channel" refers to a communications path that is used to carry control signals including signals that are used to request and/or provide patching connectivity information. This "control channel" is separate from the data channels that are provided in all standard network patch cords and cables that carry information signals that are being transmitted between end devices through the network. For example, in a standard RJ-45 patch cord, the eight conductors that form four differential pairs of conductors form four data channels. Some specialized RJ-45 patch cords are known in the art that include, for example, a ninth conductor. The ninth conductor in these patch cords typically comprises a control channel that carries control information. As discussed below, according to certain embodiments of the present invention, the separate control channel may include two conductors, one of which carries a control signal and the second of which carries a ground reference. Before discussing operation of the serial ID chips 180, the trace buttons 130 and the LEDs 140, it is helpful to discuss the structure of certain patch cords according to embodiments of the present invention that may be used to automatically track patch cord connectivity.

Figure 6A:
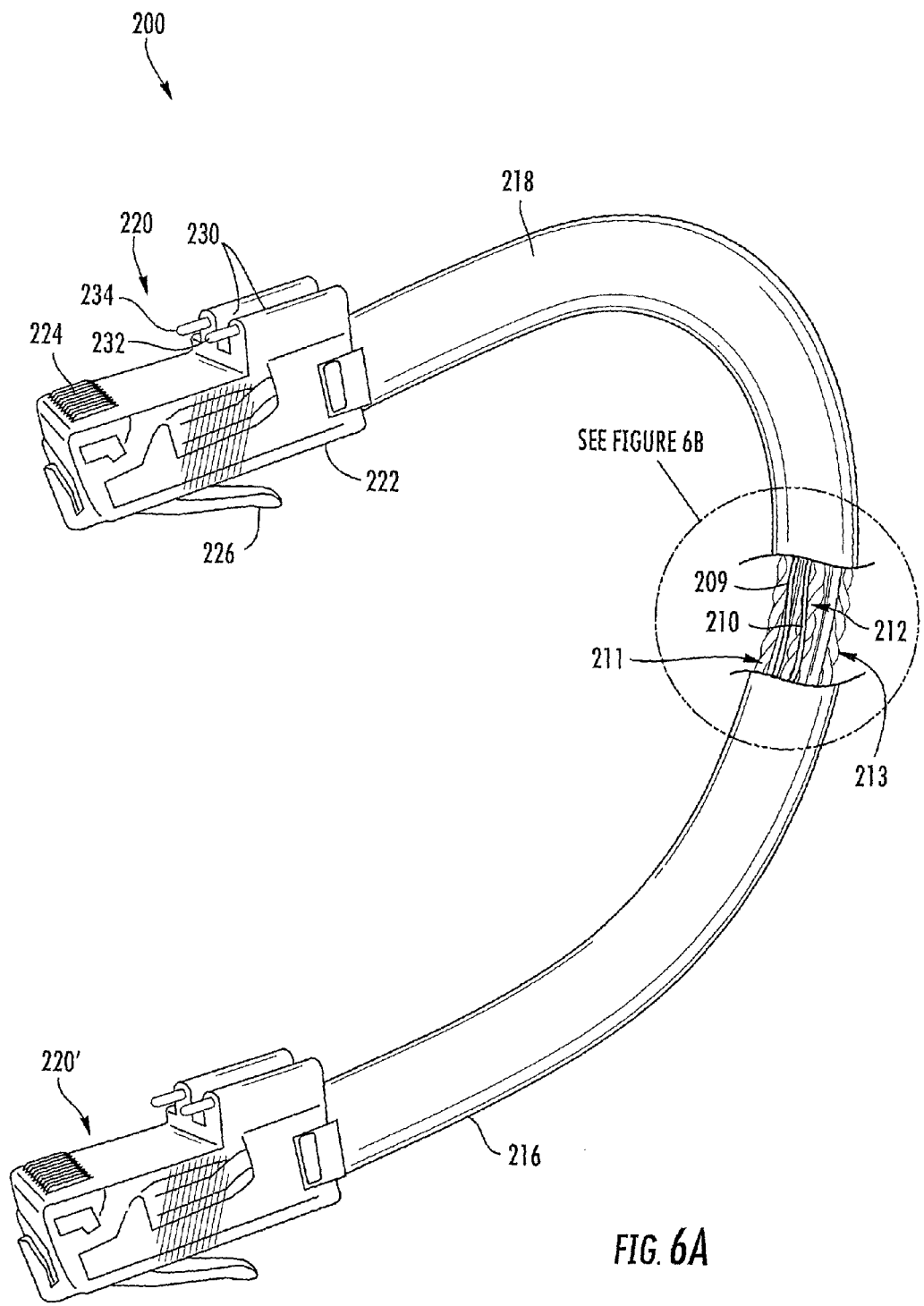
FIG. 6A is a perspective view of a patch cord that may be used in certain embodiments of the present invention.
Figure 6B:
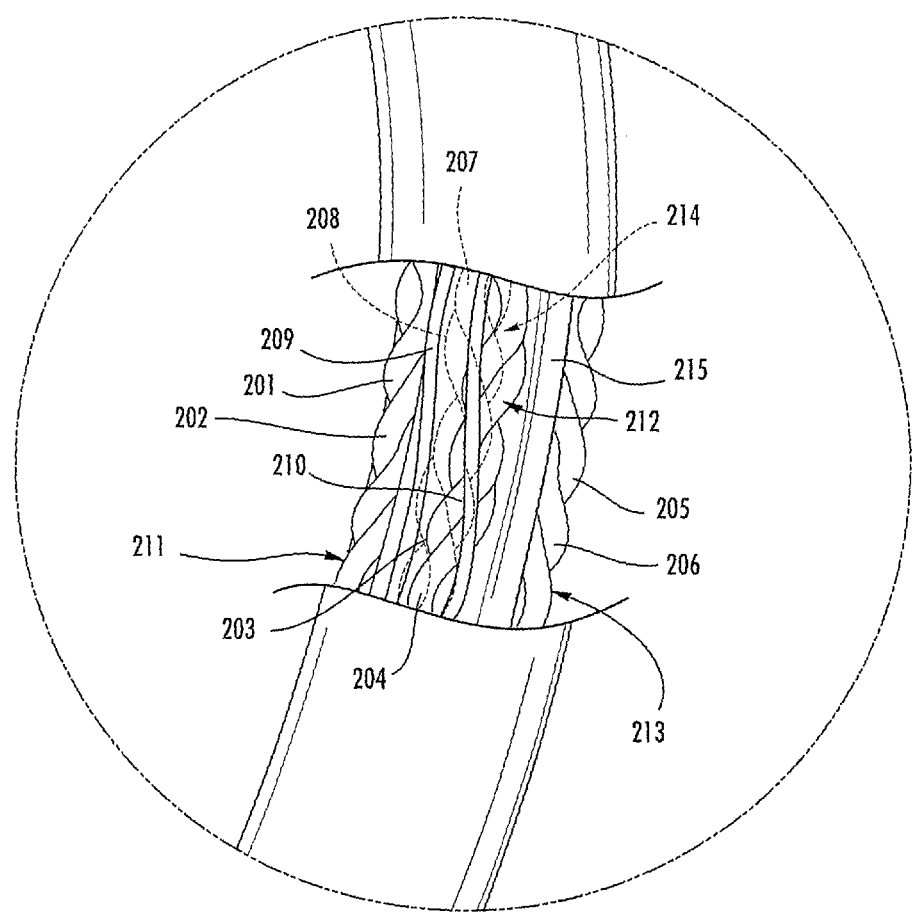
FIG. 6B is an enlarged view of a portion of the patch cord of FIG. 6A.

FIG. 6A is a perspective view of an RJ-45 style patch cord 200 according to embodiments of the present invention that may be used to communicate signals to and from the serial ID chips 180. The patch cord 200 may be used to implement each of the patch cords 22, 50, 54 in the inter-connect communications system 10 of FIG. 1. FIG. 6B is an enlarged view of a portion of the patch cord of FIG. 6A.

As shown in FIGS. 6A and 6B, the patch cord 200 includes a communications cable 218 that is terminated with a pair of communication plugs 220, 220'. The communications cable 218 includes eight insulated conductive wires 201-208 that are arranged as four differential twisted pairs of conductive wires 211-214. The communications cable 218 may also include a separator 215 that separates at least some of the differential pairs 211-214 from one another. The eight conductive wires 201-208 and any separator 215 are typically twisted so as to apply a "core twist" to the cable 218.

Additionally, ninth and tenth conductive wires 209, 210 are included within the cable 218. The ninth and tenth conductive wires 209, 210 may be, for example, insulated copper wires, although other conductors may be used and/or the insulation may be omitted. These ninth and tenths wires 209, 210 may be used to transmit signals to and from the serial ID chip 180 associated with the connector port 34 that the patch cord 200 is plugged into. The ninth wire 209 may be a signal carrying wire and the tenth wire 210 may be a ground wire. The ninth and tenth wires 209, 210 may or may not be twisted together. A jacket 216 encloses the first through eighth conductive wires 201-208, the ninth and tenth conductive wires 209, 210 and any separator 215. The ninth and tenth wires 209, 210 may be sized differently than the first through eighth conductive wires 201-208. For example, in some embodiments, the ninth and tenth conductive wires 209, 210 may be smaller than the first through eighth conductive wires 201-208.

As is further shown in FIGS. 6A and 6B, plug 220 includes a plug housing 222, eight plug blades (or other plug contacts) 224 that are mounted at a top forward surface of the housing 222, a plug latch 226 and a pair of serial ID chip contacts 232, 234. Plug 220 may comprise a conventional RJ-45 plug except that the top rear surface of the housing 220 includes two contact pin housings 230 that house respective ones of the contacts 232, 234. The contact 232 may be electrically connected to the ninth wire 209 in the cable 218, via, for example, an insulation piercing contact (not shown in FIG. 6A). The contact 234 may be electrically connected to the tenth wire 210 in the cable 218 in a similar fashion. In the depicted embodiment, the contacts 232, 234 may be "pogo" style contacts that comprise a conductive pin that is spring loaded in its respective contact pin housing 230. Plug 220' may be identical to plug 220 and hence will not be discussed separately herein.

When plug 220 is inserted into one of the RJ-45 connector ports 34 on the patch panel 32, the contacts 232, 234 come into physical contact with the front face of the patch panel 32 just above the plug receiving cavity of the connector port 34 that the plug 220 is received within. The contacts 232, 234 are positioned within the plug housing 220 so that each of the contact pins 232, 234 will be driven backwards a small distance into its contact pin housing 230 by the front face of the patch panel 32 when the plug 220 is fully inserted within and latched within the connector port 34. The spring loaded design of the contact pins 232, 234 allows this backward movement of the contact pins 232, 234, and the spring bias on each of the contact pins 232, 234 provides a force that holds each contact pin 232, 234 in firm contact with the contact surface on the front face of the patch panel 32.

Referring back to FIGS. 2 and 3, it can be seen that a pair of contacts (in the form of a pair of contact pads 150, 152) are provided on the patch panel 32 above the plug receiving cavity of each connector port 34. The plug 220 may be designed so that contact pin 232 comes into contact with contact pad 150 and contact pin 234 comes into contact with contact pad 152 when the plug 220 is received within one of the connector ports 34. Thus, the contact pins 232, 234 on plug 220 and a respective one of the pairs of contact pads 150, 152 may provide a communications path that allows a data signal carried on the ninth conductive wire 209 and a ground reference carried on the tenth conductive wire 210 to be transmitted over the patch cord 200 to or from the serial ID chip 180 that is associated with the connector port 34 that the patch cord 200 is plugged into.

Methods according to embodiments of the present invention for automatically tracking communications paths from each connector port 34 on the patch panel 32 to end devices in both the work areas (e.g., the computers 20 of FIG. 1) and in the computer room (e.g., the switches 42 and even the router and servers 46) will be described herein. Before doing so, methods of tracking patching connections between two patch panels according to embodiments of the present invention will be described, and this description will then be extended to explain how connections between a patch panel and one or more end devices may be automatically tracked.

Specifically, the communications patching system of FIG. 1 is commonly referred to as an "inter-connect" communications patching system. In such inter-connect patching systems, the communications path between each work area device 20 and network switch 42 typically traverses only a single patch panel 32. In inter-connect systems, connectivity changes are typically made by rearranging the patch cords 50 that run between the patch panels 32 and the network switches 42. Those of skill in the art will appreciate, however, that in many situations, another type of patching system is used that is referred to as a "cross-connect" patching system. In a cross-connect patching system, an extra set of patch panels are provided so that the patching changes may be made by rearranging patch cords that extend between two patch panels instead of rearranging patch cords that extend from a patch panel to a network switch.

Figure 7:
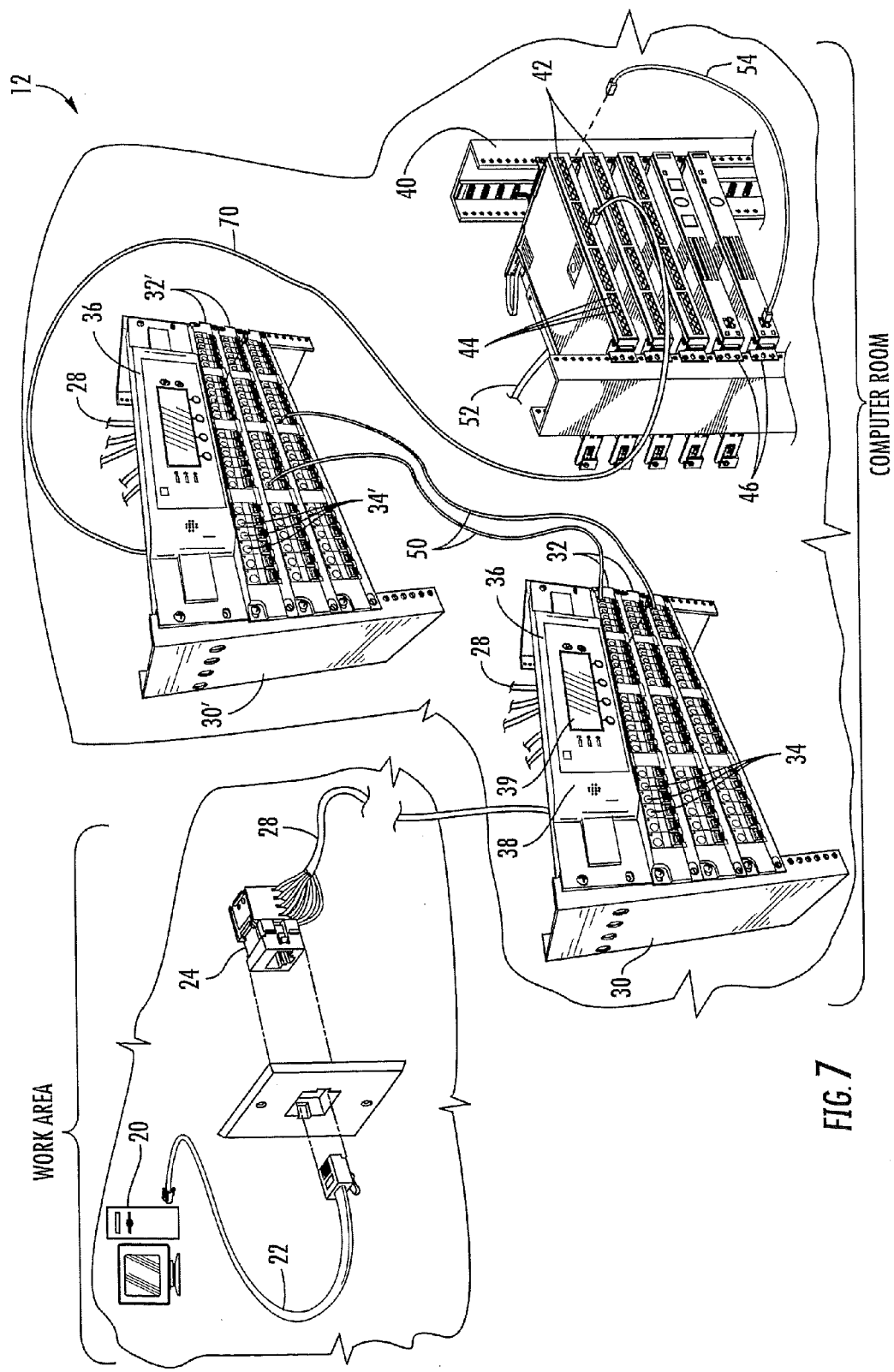
FIG. 7 is a schematic view of a simplified cross-connect communications patching system according to certain embodiments of the present invention.

FIG. 7 is a schematic view of a simplified cross-connect communications patching system 12 according to certain embodiments of the present invention. As shown in FIG. 7, the cross-connect system 12 is almost identical to the inter-connect communications patching system of FIG. 1, except that a second set of patch panels 32' are provided between the first set of patch panels 32 and the network equipment 42/46. Thus, in the cross-connect system 12 of FIG. 7, the work area computer 20 is connected by patch cord 22 to a modular wall jack 24. A communications cable 28 is routed from the wall jack 24 to an individual connector port 34 on one of the patch panels 32 that are mounted on the first equipment rack 30. However, in contrast to the inter-connect system of FIG. 1, the cross-connect patching system includes a second equipment rack 30' that has a plurality of patch panels 32' mounted thereon. The first set of patch cords 50 are used to interconnect the connector ports 34 on the patch panels 32 to respective ones of connector ports 34' on the patch panels 32'. Network switches 42 and network routers/servers 46 are mounted on a third equipment rack 40. A second set of patch cords 70 are used to connect the connector ports 44 on the network switches 42 to the back end of respective ones of the connector ports 34' on the patch panels 32'. A third set of patch cords 54 may be used to interconnect other of the connector ports 44 on the switches 42 with connector ports provided on the network routers/servers 46. In the cross-connect patching system of FIG. 7, connectivity changes are typically made by rearranging the patch cords 50 that interconnect the connector ports 34 on the patch panels 32 with respective of the connector ports 34' on the patch panels 32'. The patch panels 32' may be identical to the patch panels 32, and hence the components thereof will not be described further herein, and instead a prime designation (') will simply be added to each component (e.g., patch panel 32' has a printed circuit board 120') to distinguish between components of one of the patch panels 32 and components of one of the patch panels 32'.

The connectivity for a patch cord 50 that is routed between a connector port 34 on patch panel 32 and a connector port 34' on one of the patch panels 32' may be automatically determined as described below. For purposes of this discussion, it will be assumed that the patch cord 50 has the structure of the patch cord 200 of FIGS. 6A-6B.

Operations may begin with the plug 220 on patch cord 200 being inserted into one of the connector ports 34 of patch panel 32, and the plug 220' on the other end of the patch cord is inserted onto one of the connector ports 34' on one of the patch panels 32'. Once the plug 220 has been inserted into the connector port 34, it blocks the path between the emitter 172 and detector 170 associated with the connector port 34 which receives the plug 220. The detector 170 senses that it is no longer receiving a signal from the emitter 172, and this information is provided to the microprocessor 190. The microprocessor 190 on patch panel 32 may then notify the rack manager 36 that a patch cord has been plugged into the specific connector port 34 that received the plug 220.

The microprocessor 190 may have a plurality of output pins. As noted above, each output pin may be connected to a respective one of the contact pads 150 via a respective one of a set of circuit traces 156 on the printed circuit board 120. The microprocessor 190 may send a control signal over, for example, one of the circuit traces 156 to the contact pad 150 associated with the connector port 34 that received the plug 220. This control signal passes though the contact pad 150 and is carried on the ninth wire 209 (with a ground reference supplied by the patch panel 32 carried on the tenth wire 210) of the patch cord 200 to the plug 220' on the far end of the patch cord 200. Since the plug 220' is plugged into a connector port 34' on one of the patch panels 32', the contacts 232', 234' on plug 220' will be in contact with the contact pads 150', 152' associated with the connector port 34' that plug 220' is plugged into that are located on the printed circuit board 120' of the patch panel 32'. These contact pads 150', 152' place the ninth and tenth wires 209, 210 of the patch cord 200 in communication with the serial ID chip 180' that is associated with the connector port 34' on patch panel 32' that received plug 220' so that the control signal transmitted by the microprocessor 190 on patch panel 32 is received by one of the serial ID chips 180' on the patch panel 32'.

The serial ID chips 180, 180' may draw their operating voltage over the signal line input 209. Thus, before the microprocessor 190 transmits a signal to the serial ID chip 180' over the ninth and tenth wires 209, 210 of the patch cord 200, the microprocessor 190 may raise the voltage on the signal line 209 to, for example, 3 to 5 volts. This voltage may be used to power the serial ID chip 180'. As a result, the serial ID chip 180' does not require a separate power source. While it may not be particularly difficult to provide a power source to serial ID chip 180' since it is mounted on an intelligent patch panel 32', as discussed herein, the ability to power a serial ID chip from a remote location becomes more important when the serial ID chip is mounted on other devices or equipment such as network devices, switches, wall jack assemblies and/or work area end devices.

When the serial ID chip 180' receives the control signal from the microprocessor 190, it sends a responsive control signal back over the signal line 209 of patch cord 200 to the microprocessor 190. This responsive control signal may include the unique identification number associated with the connector port 34' of patch panel 32' that the plug 220' of patch cord 200 is inserted into. This unique identifier may then be extracted from the responsive control signal by the microprocessor 190. As the microprocessor 190 already knows the unique identifiers of each of the serial ID chips 180 on patch panel 32, it may then pass to the rack manager 36 the unique identifiers of the two connector ports 34, 34' that are connected by the patch cord 200 for logging in a database or table of patch cord connections. Thus, the rack manager 36 on the equipment rack that includes patch panel 32 can automatically determine and log the identifiers of the connector ports 34, 34' that are connected by the patch cord 200. This information may be used to affirmatively track the patching connections between intelligent patch panels in the communications patching system 12.

The above example illustrates how patching connections may be automatically tracked between intelligent patch panels such as patch panels 32 and 32'. Pursuant to further embodiments of the present invention, passive electronic labels are provided that may be mounted on network equipment (e.g., network switches, routers, servers, etc.), wall plates and user end devices (e.g., personal computers, printers, Internet telephones, etc.). These passive labels include serial ID chips that facilitate automatically tracking patch cord and cabling connectivity between intelligent patch panels and other devices in the network.

Figure 8:
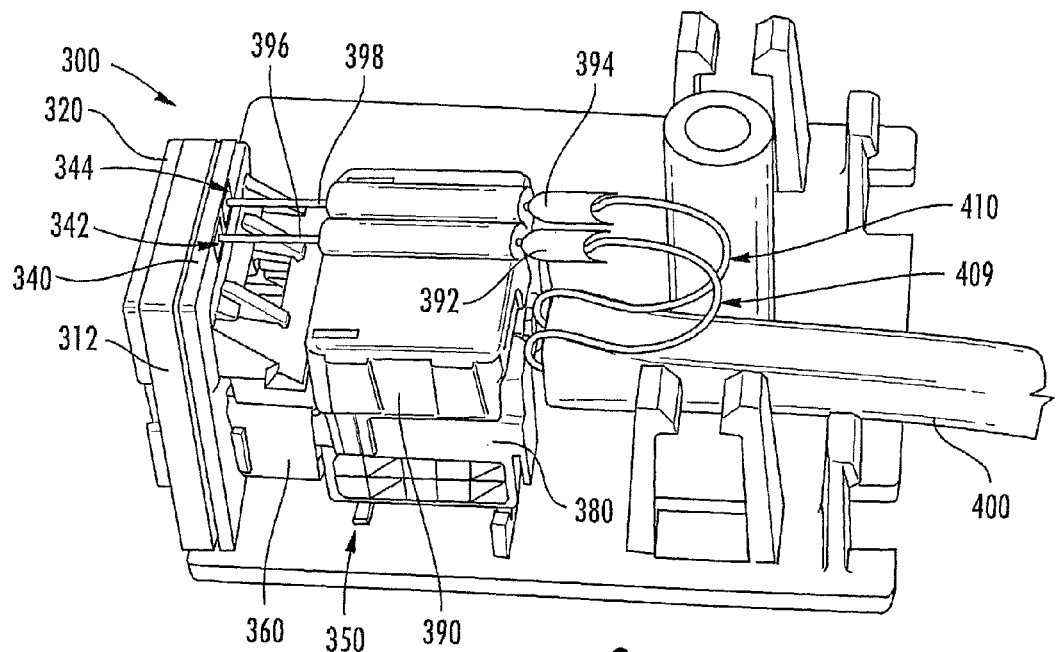
FIG. 8 is a perspective view of a' modular wall jack assembly according to embodiments of the present invention.
Figure 9:
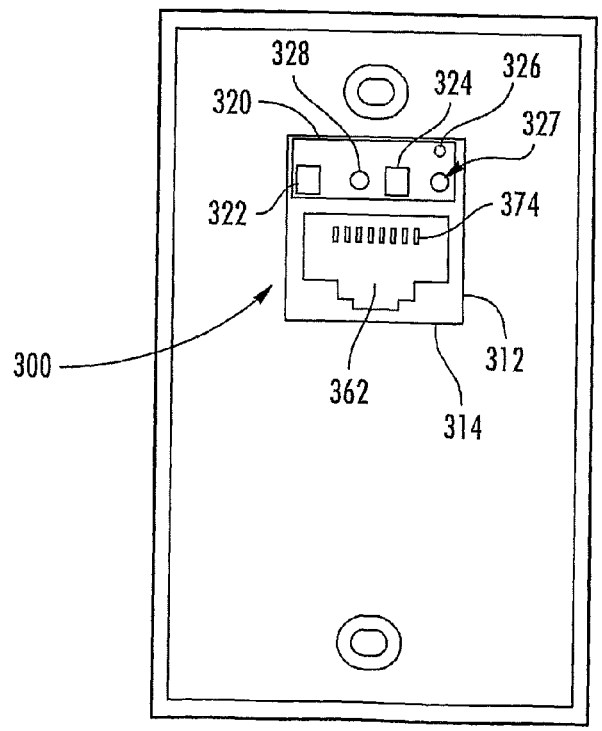
FIG. 9 is a schematic front view of the modular wall jack assembly of FIG. 8.
Figure 10:
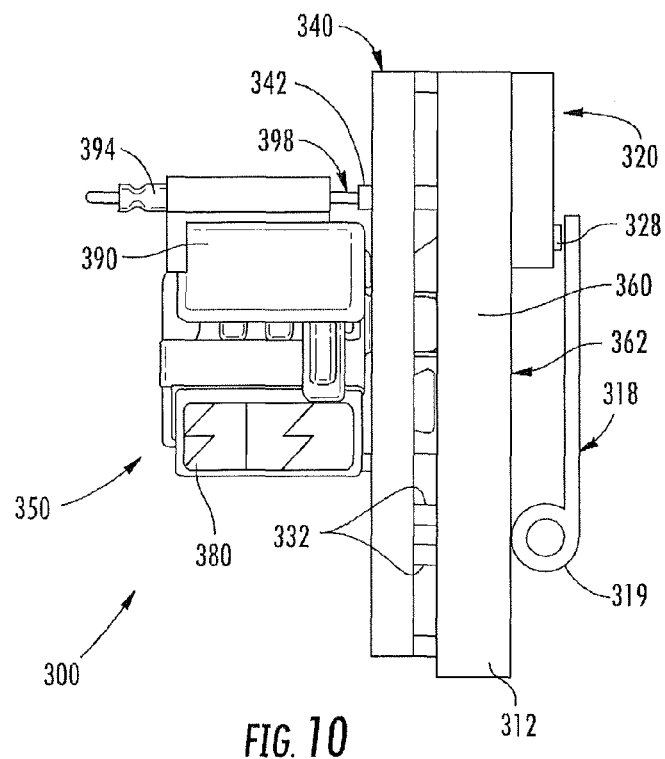
FIG. 10 is a schematic side view of the modular wall jack assembly of FIG. 8.
Figure 11:
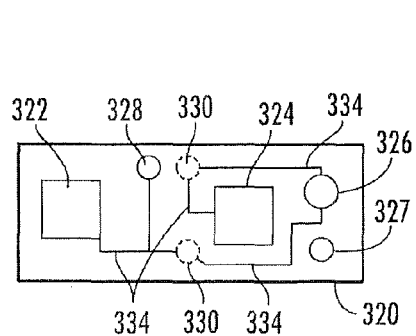
FIG. 11 is a schematic plan view of the front printed circuit board of the modular wall jack assembly of FIG. 8.
Figure 12:
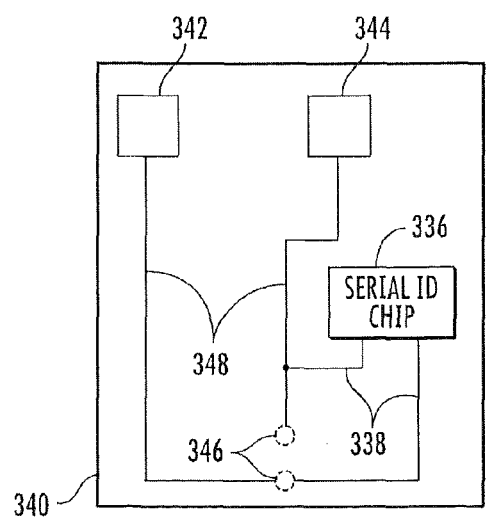
FIG. 12 is a schematic plan view of the rear printed circuit board of the modular wall jack assembly of FIG. 8.
Figure 13:
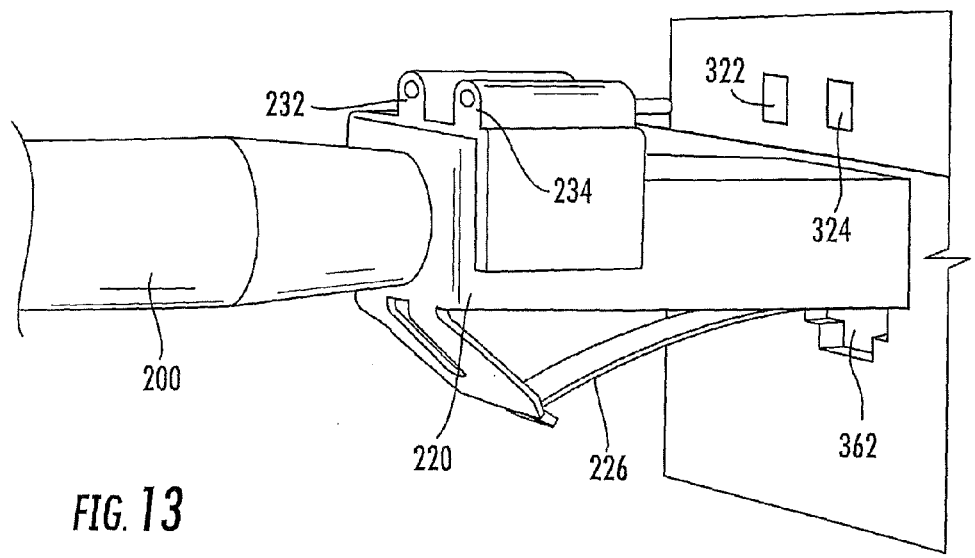
FIG. 13 is a perspective view of the modular wall jack assembly of FIG. 8 with a plug of a patch cord plugged into the jack thereof.
Figure 14:
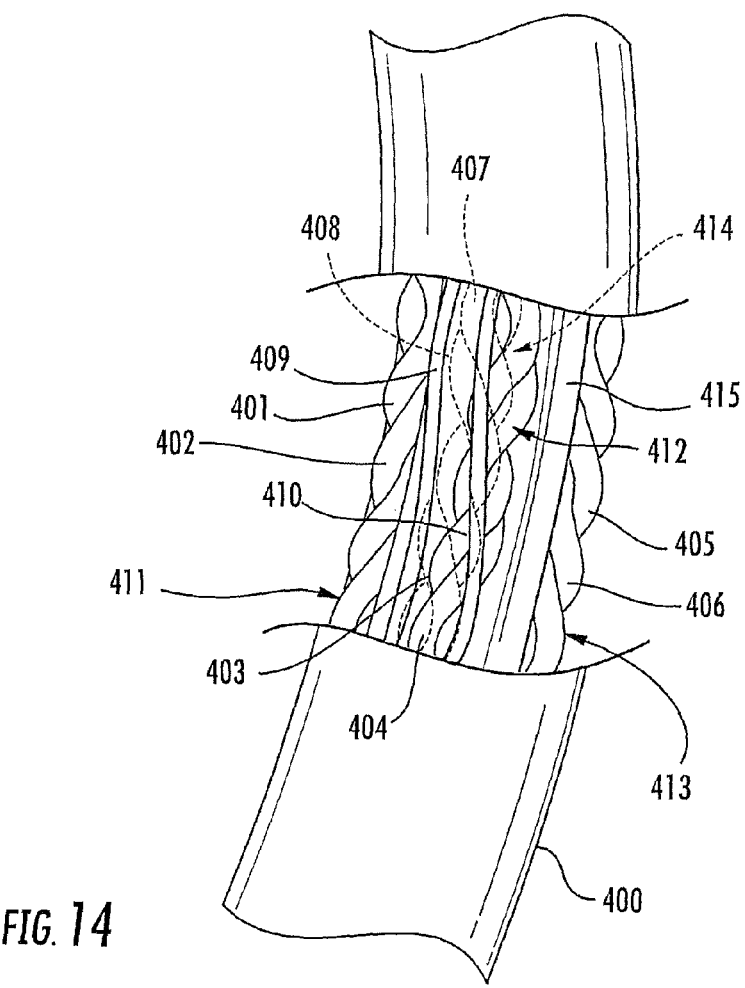
FIG. 14 is a partial cut-away perspective view of a portion of the communication cable that is attached to the modular wall jack assembly of FIG. 8.

FIG. 8 is a perspective view of a modular wall jack assembly 300 according to embodiments of the present invention having a communications cable 400 terminated thereto. The modular wall jack assemblies 24 in FIGS. 1 and 7 may be implemented using modular wall jack assembly 300, and the cables 28 of FIGS. 1 and 7 may be implemented using the communications cable 400. FIG. 9 is a schematic front view of the modular wall jack assembly 300 of FIG. 8. FIG. 10 is a schematic side view of the modular wall jack assembly 300 of FIG. 8. FIG. 11 is a schematic plan view of a front printed circuit board 320 of the modular wall jack assembly 300 of FIG. 8. FIG. 12 is a schematic plan view of a rear printed circuit board 340 of the modular wall jack assembly 300 of FIG. 8. FIG. 13 is a perspective view of the modular wall jack assembly 300 of FIG. 8 with a plug of a patch cord plugged into the wall jack thereof. Finally, FIG. 14 is a partial cut-away perspective view of a portion of the communication cable 400 that is attached to the modular wall jack assembly 300 of FIG. 8.

As shown in FIG. 8, the modular wall jack assembly 300 comprises a frame 312 and a modular wall jack 350. One end of the communications cable 400 is terminated onto a back-end wire connection assembly of the modular wall jack 350. The other end of the cable 400 (not shown in FIG. 8) may be terminated onto the back end of one of the connector ports 34 of patch panel 32. As shown in FIG. 14, the communications cable 400 includes eight insulated conductive wires 401-408 that are arranged as four differential twisted pairs of conductive wires 411-414. The communications cable 400 may also include a separator 415 that separates at least some of the differential pairs 411-414 from one another. Additionally, ninth and tenth conductive wires 409, 410 are included within the cable 400 that may be used to transmit signals to and from the serial ID chip 190 associated with the connector port 34 on patch panel 32 that the far end of cable 400 is terminated into. The ninth wire 409 may be a signal carrying wire and the tenth wire 410 may be a ground wire. The cable 400 may have the same structure as the cable 218 of patch cord 200 that is described above with respect to FIGS. 6A-6B, and hence further description of cable 400 will be omitted.

Referring to FIGS. 8-10, the wall jack assembly 300 comprises a frame 312, a front printed circuit board 320, and a rear printed circuit board 340. The front printed circuit board 320 may be mounted, for example, on a front face 314 of the frame 312, and the rear printed circuit board 340 may be mounted, for example, on a rear face of the frame 312. The frame 312 may comprise, for example, a plastic frame. As shown in FIG. 9, a plug aperture 362 is provided in the front face 314 of the frame 312. The plug aperture 362 is configured to receive the plug of a mating patch cord (e.g., patch cord 22 of FIGS. 1 and 7). A shutter 318 may also be mounted, for example, on the front face 314 of the frame 312. The shutter 318 (which is not shown in FIG. 9 in order to illustrate the plug aperture 362, but which is shown in FIG. 10) may be biased by a spring 319 to maintain the shutter 318 in a position covering the plug aperture 362 when no plug is received therein. The shutter 318 may be moved upwardly out of the way in order to gain access to the plug aperture 362.

FIG. 11 is a schematic plan view of the front printed circuit board 320. As shown in FIG. 11, the front printed circuit board 320 includes first and second contact pads 322, 324, an LED 326, and a shutter contact 328. The front printed circuit board 320 further include two metal-plated apertures 330 that each receive a respective one of two connection contacts 332 (the connection contacts 332 are shown in FIG. 10). Printed circuit board traces 334 may be used to electrically connect the metal-plated apertures 330 to the first and second contact pads 322, 324, respectively, and to the LED 326.

The shutter contact 328 may comprise, for example, a contact pad that is connected to one of the conductive traces 334 on the front printed circuit board 320. The shutter 318 may include a metal contact (not shown in the figures) that is connected to a termination resistor (not shown in the figures) or to a secondary serial ID chip (also not shown in the figures) that is, for example, embedded within the shutter 318. The termination resistor or secondary serial ID chip in the shutter 318 may be used as a sensor that indicates whether or not a patch cord is plugged into the modular wall jack 350.

In particular, as discussed above, the shutter 318 may be a spring-loaded shutter that is biased to return to its normally closed position. However, when a patch cord is plugged into the modular wall jack 350, the plug on the patch cord holds the shutter 318 in its open position. When the shutter 318 is in its closed position over the plug aperture 362, the contact on the shutter 318 mates with the shutter contact 328 on the front printed circuit board 320, electrically connecting, for example, the conductor 409 on cable 400 to, for example, the secondary serial ID chip that is on or within the shutter 318. When the microprocessor 190 sends a signal to the modular wall jack assembly 300 over conductor 409 of cable 400, whether or not a response is received to that signal will vary depending on whether or not the shutter 318 is in its open position (in which case the shutter contact 328 is open circuited) or in its closed position (in which case the shutter contact 328 is connected to the secondary serial ID chip). The secondary serial ID chip that is mounted on or within the shutter 318 may include a code that could be transmitted to the microprocessor 190 over the control channel that would indicate to the microprocessor 190 that the shutter 318 is in its closed position (and hence the wall jack assembly 350 is not in use). Once the shutter 318 is opened, the microprocessor 190 would be able to detect that the secondary serial ID chip is no longer connected to the control channel, and would take this to indicate that the wall jack assembly 350 is in use (i.e., that a patch cord is plugged into the modular wall jack 350). Thus, the shutter 318 may be used in the manner described above as a sensor that indicates whether or not a patch cord is plugged into the modular wall jack 350. This may be beneficial, for example, because when the system senses that a patch cord has newly been plugged into a particular wall jack 350, the system may then send control signals through the control channel 409, 410 of the horizontal cable 400 that is attached to the wall jack 350 in the manner described herein in an effort to identify the end device that is connected by the patch cord to the modular wall jack 350 at issue.

An additional advantage of providing a shutter 318 that acts as a sensor is that it allows the system a means of determining if a patch cord is plugged into a particular modular wall jack 350, even if a regular patch cord is plugged into the jack as opposed to a patch cord according to embodiments of the present invention such as the patch cord 200 of FIGS. 6A-6B. In practice, it may be difficult to ensure the use of patch cords having the extra conductors 209, 210 and the contacts 232, 234 in the work areas, as users may plug in their own patch cords without the authorization of a system administer, particularly as users will often be unaware of the special tracking capabilities provided by the jacks, patch panels, cords and cables according to embodiments of the present invention. Thus, by providing wall jack assemblies 300 that include a shutter 318, the system may at least determine which wall jack assemblies 300 have a patch cord plugged into them, even when a regular patch cord is used that does not have capabilities for allowing the system to further identify the work area end device that is connected to the other end of the patch cord.

FIG. 12 is a schematic plan view of the rear printed circuit board 340. The rear printed circuit board 340 includes first and second contact pads 342, 344, and two metal-plated apertures 346 that each receive a respective one of the connection contacts 332. Printed circuit board traces 348 may be used to electrically connect the metal-plated apertures 346 to the first and second contact pads 342, 344, respectively. As shown in FIG. 10, the connection contacts 332 extend between the front printed circuit board 320 and the rear printed circuit board 340 to provide electrical connections therebetween. In some embodiments, the connection contacts 332 may comprise metal bars that extend between the rear printed circuit board 340 and the front printed circuit board 320. In some embodiments, these metal bars may have eye-of-the needle terminations on each end thereof to facilitate mounting the connection contacts 332 in the metal-plated apertures 330, 346.

As shown best in FIGS. 8 and 10, the modular jack 350 may comprise, for example, any RJ-45 jack. In the depicted embodiment, the jack 350 includes a jack frame 360, a communication insert (which is not visible in the figures), an IDC housing 380, and a punch-down cover 390. As known to those of skill in the art, the jack frame 360 may comprise a plastic housing piece, and may define the plug aperture 362 of the jack 350. The jack frame 360 may have one or more attachment mechanisms such as, for example, snap clips, that may be used to mount the jack frame 360 (and the remainder of the jack 350) to the frame 312.

The communication insert (which is not visible in the figures) may comprise, for example, a printed circuit board that has a plurality of jackwire contacts mounted thereon that serve as input contacts of the modular jack 350. The printed circuit board may also have a plurality of output contacts (not visible in the figures), mounted thereon, such as a plurality of IDCs. Conductive traces (not visible in the figures) printed on one or more layers of the printed circuit board may be used to electrically connect each jackwire contact to a respective one of the IDCs. The printed circuit board may also include a plurality of circuit elements that are configured to reduce or cancel crosstalk, improve return loss, and the like. As a wide variety of communications insert configurations are available and well known in the art, further description thereof will be omitted here. It will also be appreciated that jacks that do not include printed circuit boards could also be used.

The IDC housing 380 may comprise a plastic housing piece that covers and protects the IDCs, while providing access to a central part of each IDC so that conductors from a communications cable (such as the cable 400 of FIGS. 8 and 14) may be inserted therein.

The punch-down cover 390 may comprise a plastic cover piece that may be mounted on top of the IDC housing 380. The punch-down cover 390 may be used to seat the insulated conductors of cable 400 into respective ones of the IDCs of communications insert. In the embodiment depicted in FIGS. 8-13, the cover 390 includes first and second wire terminations 392, 394 that may be used to receive the conductors 409, 410 that are included in the cable 400. The wire terminations 392, 394 may, for example, be crimped wire terminations that are permanently crimped onto the conductors 409, 410, respectively, using a special tool. The punch-down cover 390 may further include first and second spring loaded pins 396, 398 which are electrically connected to the first and second wire terminations 392, 394, respectively. As can be seen from FIGS. 8, 10 and 12, the first and second spring loaded pins 396, 398 may be configured to mate with the first and second contact pads 342, 344 on the rear printed circuit board 340 when the punch-down cover 390 is installed on the IDC housing 380, thereby providing an electrical path that connects the conductors 409, 410 that are included in the cable 400 to the rear printed circuit board 340.

A serial ID chip 336 may be mounted (or otherwise electrically connected to) one of the front printed circuit board 320 or the rear printed circuit board 340. In the embodiment of the modular wall jack assembly 300 pictured in FIGS. 8-13, the serial ID chip 336 is mounted on the rear printed circuit board 340. As shown in FIG. 12, the serial ID chip 336 is electrically connected to the first and second contact pads 342, 344 of rear printed circuit board 340 via the conductive traces 338, 348. Thus, the wire terminations 392, 394, the spring loaded pins 396, 398, the contact pads 342, 344 and the conductive traces 338, 348 connect the ninth and tenth conductive wires 409, 410 of cable 400 to the serial ID chip 336, thereby providing a control communications path from the patch panel 32 to the serial ID chip 336. In the same manner described above with reference to serial ID chip 180', a power signal may be provided to the serial ID chip 336 via the ninth conductive wire 409, and a ground reference may be provided to serial ID chip 336 via the tenth conductive wire 410. Thus, the wall jack assembly 300 does not require a separate power source to power serial ID chip 336.

As can be seen from FIG. 10-12, the serial ID chip 336 is also connected to the contact pads 322, 324 on front printed circuit board 320 via the traces 334 on front printed circuit board 320, the connection contacts 332, and the conductive traces 338 on the rear printed circuit board 340. The contact pad 322 provides a power connection path and a data path to and from serial ID chip 336, while contact pad 324 provides a ground connection path that provides a ground reference to serial ID chip 336.

FIG. 13 is a perspective view of the modular wall jack assembly 300 of FIG. 8 with the plug 220 of the patch cord 200 of FIGS. 6A-6B plugged into the jack 350. As is shown in FIG. 13, the pogo-style spring-loaded contact pins 232, 234 of plug 220 are positioned so that they will make mechanical and electrical contact with the contact pads 322, 324 when the plug 220 is fully inserted within the plug aperture 362.

The modular wall jack assembly 300 of FIGS. 8-13 may operate as follows. As discussed above, the far end of communications cable 400 (not visible in FIG. 8) is terminated into a connector port 34 on one of the intelligent patch panels 32 of FIGS. 1-5. The microprocessor 190 on patch panel 32 transmits a control signal that is carried to the conductors 409, 410 of cable 400 via (1) the printed circuit board traces 156 (see FIG. 3), (2) the contact pads 150, 152, (3) the printed circuit board traces 160, (4) the connection contacts 129 (see FIG. 4), (5) the printed circuit board traces 118 (see FIG. 4), (6) the pads 112, 114 (see FIG. 4), (7) the spring loaded pins 70, 72 (see FIG. 5) and (8) the wire terminations 66, 68 (see FIG. 5). This control signal is then carried over the conductors 409, 410 of the cable 400, with the control signal being carried on the conductor 409 and the ground reference being carried on conductor 410. As the conductors 409, 410 of cable 400 are terminated onto the first and second wire terminations 392, 394 of cover 390 (see FIG. 8), the control signal on the conductors 409, 410 passes through the terminations 392, 394 to the first and second spring loaded pins 396, 398. The control signal then passes through the spring loaded pins 396, 398 to the first and second contact pads 342, 344 on the rear printed circuit board 340 (see FIGS. 8 and 12), where it is passed to the serial ID chip 336 via conductive traces 338, 348 (see FIG. 12). Thus, a communications path is provided over which control signals may be transmitted from the microprocessor 190 on patch panel 32 to the serial ID chip 336 of modular wall jack assembly 300. As discussed above, the microprocessor 190 may supply a voltage of, for example, 3 to 5 volts, to the signal line 409 of cable 400 so that the signal line 409 may also provide an operating voltage that powers the serial ID chip 336. As a result, the serial ID chip 336 need not separately draw power from another source.

Thus, the serial ID chip 336 on modular wall jack assembly 300 can receive a control signal that is transmitted by the microprocessor 190. The microprocessor 190 on the patch panel 32 may, in some embodiments, periodically transmit a signal to the serial ID chip 336. In response to receiving such a signal, the serial ID chip 336 may send a responsive signal to the microprocessor 190 over the conductor 409 of the cable 400. This responsive signal may include the unique identification number that has been previously programmed into the serial ID chip 336, along with other information such as location information that may be programmed into the serial ID chip 336. Thus, according to embodiments of the present invention, the intelligent patching system may automatically confirm/determine the connectivity of both backbone cabling that extends between intelligent patch panels and horizontal cabling that extends from the patching system to work area outlets. This information is currently input manually in many patching systems into a system administrator database in order to facilitate the automatic tracking of patching/cabling connections. However, pursuant to embodiments of the present invention, the system can automatically discover either or both the backbone and horizontal cabling connectivity, thereby eliminating the need to manually track and input this data and avoiding data entry errors that can occur when such information is input to the system administrator database.

In further embodiments of the present invention, the serial ID chip 336 could be mounted on or within the shutter 318, and the "secondary serial ID chip" discussed above that may be included in the shutter 318 in some embodiments may be omitted. In such embodiments, the serial ID chip 336 could contain the same information as discussed above, but would simply be mounted in the alternative location (i.e., on or within the shutter 318). When the shutter 318 is in its closed position in such embodiments, the microprocessor 190 would be able to receive the information stored in the serial ID chip 336, which would indicate that no patch cord is contained within the wall jack 350. When the shutter 318 is opened so that a patch cord may be inserted into the jack 350, the microprocessor 190 would sense that the circuit is open, which it could interpret as meaning that the jack 350 is in use.

The ability to automatically determine the connectivity of the backbone and/or horizontal cabling using the methods and systems according to embodiments of the present invention may be particularly advantageous in patching systems that include consolidation points. As known to those of skill in the art, a consolidation point refers to a box or other device that has a plurality of connector ports that is located in a work area. A plurality of horizontal cables are terminated to respective ones of the connector ports. Consolidation points are used, for example, in work areas that include cubicles. As these cubicles may be rearranged with some regularity, horizontal cables are typically not run to the individual cubicles and, instead, are run to the consolidation point. Patch cords are then run from the consolidation point to modular RJ-45-to-RJ-45 wall jack assemblies that are provided at the individual cubicles. Thus, in such environments, the horizontal cabling may comprise both a cable that runs from one of the patch panels 32 to a consolidation point, and a patch cord that runs from the consolidation point to a modular RJ-45 wall jack 24 in the cubicle.

When the cubicles are to be reconfigured, the patch cords are unplugged from the consolidation point and then are re-plugged into the consolidation point once the cubicles have been rearranged. When this occurs, the connectivity from the connector ports at the consolidation point to the modular wall jack assemblies at the individual cubicles is typically changed. If the modular wall jack assemblies according to embodiments of the present invention are used, the system can automatically discover the new "horizontal cabling" topology by automatically determining the connections between each connector port at the consolidation point and the connector ports on the modular wall jack assemblies at the individual cubicles.

As discussed above, information such as, for example, location information, may be programmed into the serial ID chip 336. Pursuant to embodiments of the present invention, this information may be programmed into the serial ID chips 336 as follows. Typically, when a horizontal cable 400 is installed that connects a connector port 34 on a patch panel 32 to a modular wall jack assembly 300, the cable 400 will be tested after it is installed to confirm that each differential pair is properly terminated at both ends of the cable 400. This testing is typically performed by a technician who plugs a handheld tester into each modular wall jack assembly 300 and sends a test signal over the cable 400. A second technician in the computer room then monitors for these test signals to confirm that each cable 400 is properly terminated. Pursuant to embodiments of the present invention, the conventional handheld test equipment may be modified to include a pair of contacts that are configured to mate with the contact pads 322, 324 on the modular wall jack assembly 300. The handheld test equipment may be further modified to have the ability to transmit control signals to the serial ID chips 336 included on modular wall jack assemblies 300. These control signals include information that is to be programmed into the serial ID chip 336. Such information may include, for example, the location of the modular wall jack assembly 300 (e.g., an office number and a port number). Thus, during the testing process that follows cable installation, a technician may easily program the serial ID chip 336 on each modular wall jack assembly 300 with a unique identifier and/or with location information.

Pursuant to still further embodiments of the present invention, adapters may be provided for the above-described handheld test equipment that have built in local positioning system capabilities so that the location information could be automatically determined by the handheld test equipment rather than having to be manually entered by a technician. Such adapters may further automate the process of storing location information in the serial ID chips. In other embodiments, handheld test equipment may be provided that has the local positioning system capabilities built into the handheld device.

As noted above, each modular wall jack assembly 300 may include an LED 326. These LEDs may be used to indicate various information.

In some embodiments, the LED 326 may be used to provide link (circuit) status information to a technician. In many cases, offices and other areas in a building may include multiple work area connector ports, so that multiple devices (e.g., both a computer and an internet telephone) may be connected to the network. However, in some cases, due to a limited number of switch ports, only a subset of the horizontal cables attached to these wall jacks will be connected to switch ports. Consequently, it is often the case that only a subset of the modular wall jack assemblies in an office building may have full end-to-end connectivity to a connector port on a network switch.

A controller within the patching system such as, for example, the microprocessor 190 on intelligent patch panel 32 or the CPU 38 on the rack manager 36 may be used to light the LEDs 326 on the modular wall jack assemblies 300 for purposes of indicating the status of the link (i.e., the communications paths or "circuits") from the wall jack 350 to the network switch 42. By way of example, in some embodiments, the LED 326 on a particular modular wall jack assembly 300 may be lit if that assembly 300 has full end-to-end connectivity to a switch port 44. In other embodiments, the LED 326 might only be lit if the assembly 300 has full end-to-end connectivity to a switch port 44 and the switch port 44 in question is enabled. In still other embodiments, the LED 326 would be lit in response to a work order, where the work order called for the modular wall jack assembly 300 to have an end device connected thereto. In this situation, the activation of the LED 326 is used to guide the installer to plug the end device into the correct wall jack 350. In some embodiments, multiple LEDs 326 (e.g., three LEDs having different colors) or multi-color LEDs 326 (i.e., a single chip that includes LEDs having different colors) may be provided on the assembly 300, with each different color LED 326 providing a different one of the types of information listed above. In other embodiments, the LED 326 could be lit in different ways (e.g., permanently on to indicate that the wall jack assembly 300 is connected to an enabled switch port and blinking to indicate that the wall jack assembly 300 is the assembly 300 identified in a work order that an end device is to be connected to). In still other embodiments, a help desk or other administrative support function could activate the LED 326 to have the user verify that the patch cord connected to their computer (or other work area device) is connected to the correct wall jack 350.

As shown in FIGS. 9 and 11, according to still further embodiments, a status button 327 may be mounted on the front printed circuit board 320 that is configured such that when it is activated (e.g., pressed in), it causes the LED 326 to indicate the status of the link or "circuit" between the connector port 350 and a network switch. By way of example, if a communications path exists between the connector port 350 and an enabled connector port on a network switch, the LED 326 may emit a steady stream of light for so long as the status button 327 is activated. If, on the other hand, a communications path exists between the connector port 350 and a connector port on a network switch that is not enabled, the LED 326 may flash on and off for so long as the status button 327 is activated. If no communications path exists between the connector port 350 and a connector port on a network switch, the LED 326 may remain off when the status button 327 is activated. While not shown in FIGS. 9 and 11, a circuit may be provided on the front printed circuit board 320 that closes the electrical paths 334 between the LED 326 and the connection contacts 330 when the status button 327 is activated. It will also be appreciated that the functionality of the status button 327 may be implemented in numerous other ways.

The trace buttons 130 on the patch panels 32 may also be used to activate the LEDs 326 on the modular wall jack assemblies 300. In particular, in some embodiments, when a technician presses one of the trace buttons 130 that is associated with a particular connector port 34 on patch panel 32, a signal may be delivered to the microprocessor 190. In some embodiments, in response to receiving this signal, the microprocessor 190 may send a signal over the control channel 409, 410 of communications cable 400 to the LED 326. This signal causes the LED 326 to light up. In this manner, a first technician in the computer room and a second technician that moves from work area outlet to work area outlet may manually confirm the horizontal cable connectivity without the need for a handheld test device.

It will likewise be appreciated that the serial ID chips and control channel technology according to embodiments of the present invention may also be used to automatically discover the backbone cable connections that extend between intelligent patch panels of a communications patching system. In particular, after the backbone cabling has been installed, but before any patching occurs, the system software can instruct the microprocessor on each intelligent patch panel to connect to, one-by-one, the control channel associated with each connector port on the panel to read back the unique identifier of any serial ID chip that is connected through each control channel. When the microprocessor on a first intelligent patch panel commences this polling operation, if a given connector port on the first intelligent patch panel is connected via a backbone cable to another a connector port on a second intelligent patch panel, the unique identifier associated with the serial ID chip on the second patch panel would be returned to the microprocessor on the first patch panel. This unique identifier would, for example, contain the identity of the second patch panel and a port number, thereby allowing the system software to automatically document this connection. Currently, such backbone cabling connectivity information is entered manually into the system control software at the time the patching system is first installed, and this can be a time consuming and error prone process.

The above example illustrates how horizontal cable connections may be automatically tracked/mapped between an intelligent patch panel such as panel 32 and a modular wall jack assembly 300. Pursuant to still further embodiments of the present invention, the ability to automatically track cabling/patching connections may be extended even farther to work area devices. This may be accomplished through the use of passive electronic labels that may be mounted on work area devices such as computers, printers, facsimile machines, Internet telephones, Internet protocol cameras, wireless access points, medical equipment, laptops and the like, adjacent the connector port(s) that are included on such devices. Passive electronic labels may also be mounted on network switches and/or on other network devices. As discussed below, through use of these passive electronic labels, the patching systems according to embodiments of the present invention may automatically monitor, in real time, end-to-end connectivity from, for example, each switch port to the end devices in the work areas.

Figure 15:
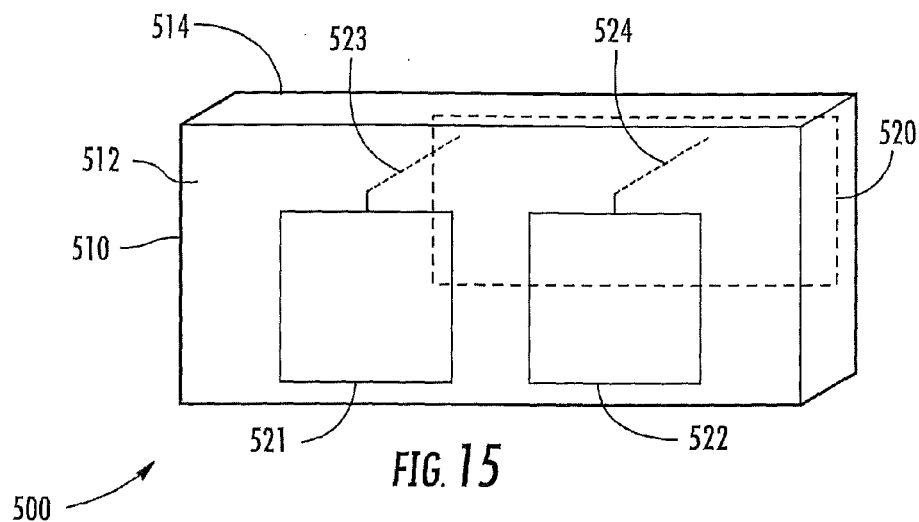
FIG. 15 is a perspective view of a portion of a passive label according to certain embodiments of the present invention.

In particular, FIG. 15 is a perspective view of a passive electronic label 500 according to certain embodiments of the present invention that may be mounted on work area devices to allow for tracking patching connections all the way to such devices. The passive label 500 depicted in FIG. 15 includes a double sided printed circuit board 510 that has a front side 512 and a back side 514, and a serial ID chip 520. The serial ID chip 520 is mounted on the back side 514 of the printed circuit board 510 (and hence is depicted using dotted lines in FIG. 15). A pair of contact pads 521, 522 is provided on the front side 512 of the printed circuit board 510. A first trace 523 connects the contact pad 521 to a first input port on the serial ID chip 520, and a second trace 524 connects the contact pad 522 to a second port on the serial ID chip 520. Contact pad 521 provides a power connection path and a data path for serial ID chip 520, and contact pad 522 provides a ground connection for serial ID chip 520. An adhesive layer (not shown) may be included on the back side 514 of the printed circuit board 510 that may be used to mount the label 500 onto work area devices such as, for example, the computer 20 of FIG. 1.

Figure 16:
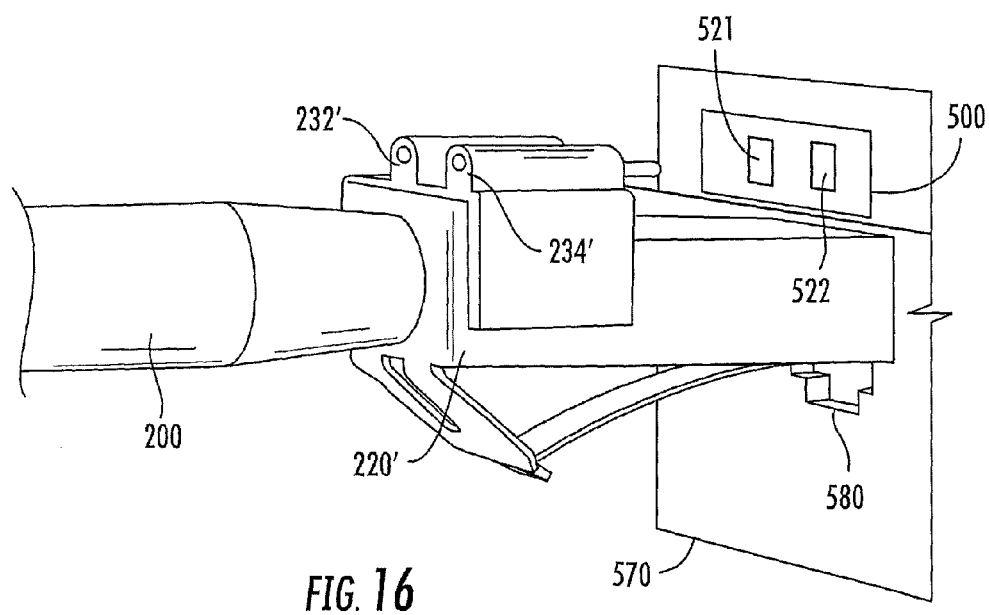
FIG. 16 is a perspective view of the label of FIG. 15 mounted on a work area device.

FIG. 16 is a perspective view of the label 500 of FIG. 15 mounted on a work area device 570 that includes a single connector port 580. FIG. 16 also depicts the plug 220' on the far end of the patch cord 200 (see FIGS. 6A and 6B) aligned for insertion into the connector port 580 of device 570.

As shown in FIG. 16, the label 500 is adhesively mounted above the connector port 580 on the work area device 570 such that the pogo-style spring-loaded contact pins 232', 234' of plug 220' will mate with the contact pads 521, 522, respectively, of label 500 when the plug 220' is inserted within the connector port 580. The length and positioning of the contact pins 232', 234' on the patch cord 200 may be designed so that the contact pins 232', 234' will make mechanical and electrical contact with the label 500, but will not make mechanical or electrical contact with a work area device which does not include a passive label according to embodiments of the present invention.

The label 500 of FIGS. 15 and 16 may operate as follows. As discussed above, the plug 220 on the far end of patch cord 200 may be inserted into the modular wall jack assembly 300 (see FIGS. 8-13). When the microprocessor 190 on patch panel 32 transmits a control signal to the rear printed circuit board 340 of modular wall jack assembly 300 such that this control signal is provided to the serial ID chip 336 in the manner described above, the control signal is also carried to the serial ID chip 520 on the label 500 via the traces 348 on rear printed circuit board 340, the connection contacts 332, the conductive traces 334 and contact pads 322, 324 on the front printed circuit board 320, the conductors 209, 210 on the patch cord 200, the contact pads 521, 522 on conductive label 500, and the conductive traces 523, 524 on the printed circuit board 510 of label 500. In particular, the control signal is carried on the conductive path that includes conductor 409, contact pads 332, 521 and conductor 209, while the ground reference is carried on the other conductive path that includes conductor 410, contact pads 334, 522 and conductor 210. In this fashion, conductive paths are provided over which a data signal, a ground reference, and an operating voltage that is used to power the serial ID chip 520 may be transmitted from the microprocessor 190 on patch panel 32 to the serial ID chip 520 of a label 500 that is mounted on a work area device.

In response to receiving the control signal that is transmitted by the microprocessor 190, the serial ID chip 520 may send a responsive control signal back to the microprocessor 190 over the same control channel. This responsive control signal may include the unique identification number that has been previously programmed into the serial ID chip 520 such as, for example, the type of device to which the label 500 is applied (e.g., desktop computer, laptop computer, Internet telephone, access point, IP camera, medical equipment, etc.) and/or the MAC identification number of the end device 570. Thus, according to embodiments of the present invention, the intelligent patching system may automatically determine the identification of actual end devices that are located in work areas.

Figure 17:
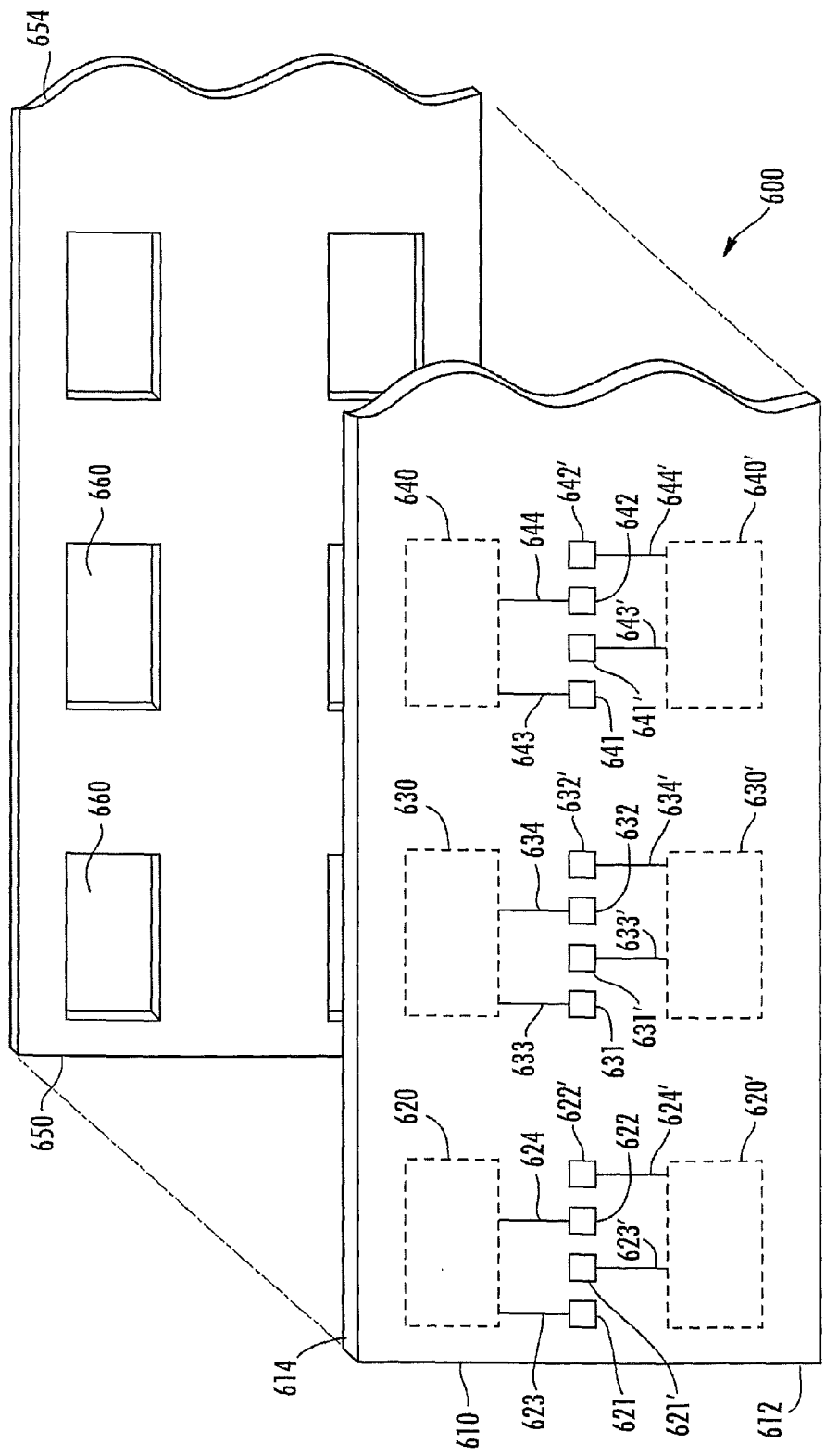
FIG. 17 is a perspective view of a portion of a passive label for a network switch according to certain embodiments of the present invention.

As is discussed in co-pending U.S. patent application Ser. No. 12/545,096 filed Aug. 21, 2009, the entire contents of which have been incorporated by reference herein, embodiments of the present invention may further include passive electronic labels 600 that may be mounted on electronic equipment such as network switches. For example, FIG. 17 is an exploded perspective view of a portion of a passive electronic label 600 that may be mounted on a network switch. The portion of the passive label 600 depicted in FIG. 17 includes a total of six serial ID chips 620, 630, 640, 620', 630', 640'.

As shown in FIG. 17, the label 600 includes a double sided printed circuit board 610 that has a front side 612 and a back side 614 and an adhesive layer 650. The six serial ID chips 620, 630, 640, 620', 630', 640' are mounted in two rows on the back side 614 of the printed circuit board 610. A first pair of contact pads 621, 622 that is associated with the first serial ID chip 620 is provided on the front side 612 of the printed circuit board 610. A first trace 623 connects the contact pad 621 to a first input port on the serial ID chip 620, and a second trace 624 connects the contact pad 622 to a second port on the serial ID chip 620. Additional pairs of contact pads 631, 632; 641, 642; 621', 622'; 631', 632'; 641', 642' and additional traces 633, 634; 643, 644; 623', 624'; 633', 634'; 643', 644' are also provided on the front side 612 of the printed circuit board 610 for the remaining five serial ID chips depicted in FIG. 17. The adhesive layer 650 may comprise a thin substrate that has an adhesive applied to each side thereof that is mounted on the back side 614 of the printed circuit board 610. The adhesive layer 650 may include a respective opening 660 for each serial ID chip. By mounting the serial ID chip in the openings 660 in the adhesive layer 650 on the back side of the printed circuit board 610, it is possible to both protect the serial ID chip from accidental damage and to reduce the number of components contained on the front side of the printed circuit board. While not shown in FIG. 17, the printed circuit board 610 may include an LED for each connector port. These LEDs may operate in the same fashion as the LEDs 326 described above, and hence will not be discussed further.

Figure 18:
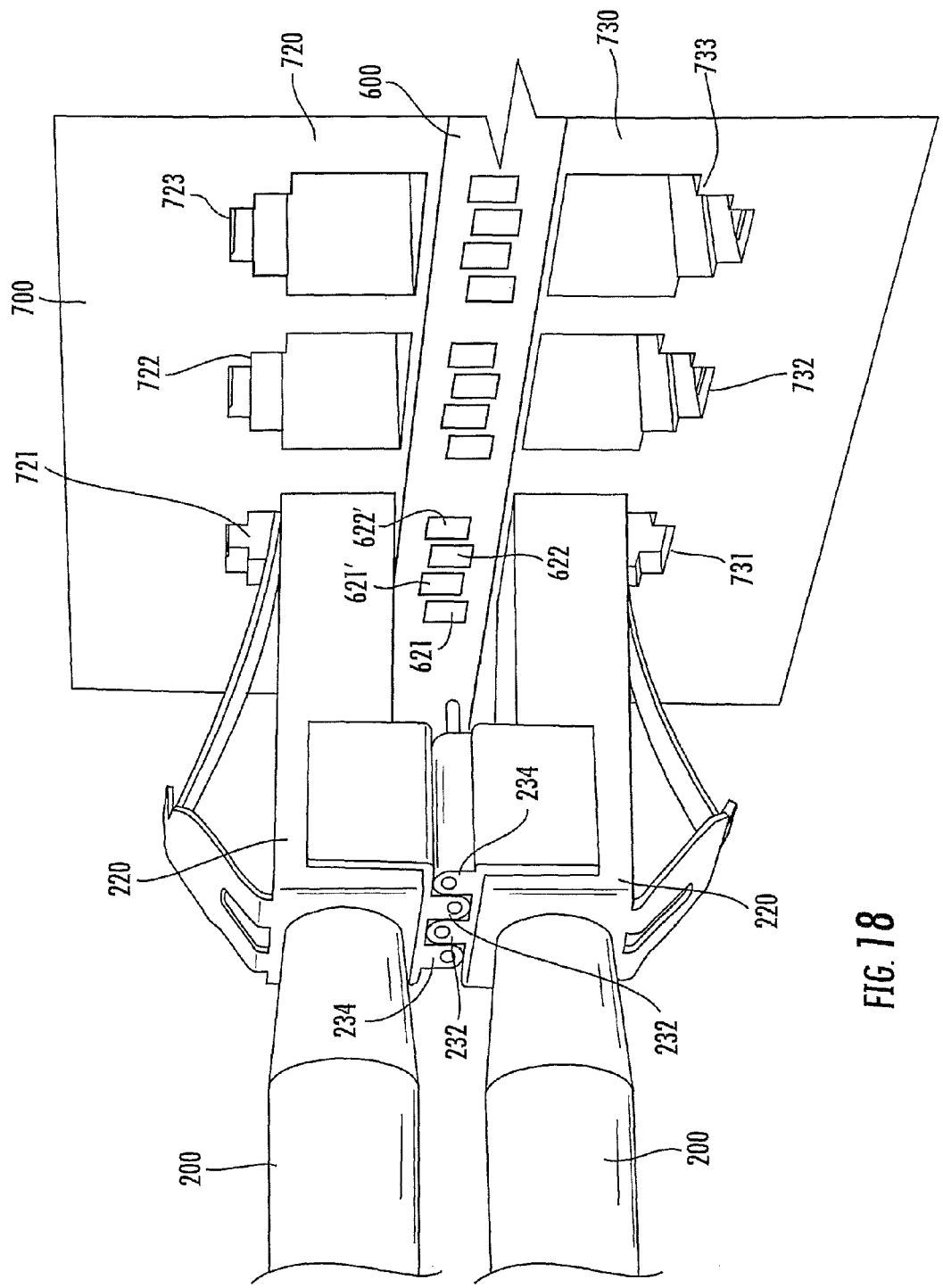
FIG. 18 is a perspective view of the label of FIG. 17 mounted on a network switch.

FIG. 18 is a perspective view of the label 600 of FIG. 17 mounted on a network device 700 that includes a top row 720 of connector ports 721, 722, 723 and a bottom row 730 of connector ports 731, 732, 733. FIG. 18 also depicts two of the patch cords 200 of FIGS. 6A and 6B that have plugs 220 aligned for insertion into the connector ports 721 and 731. As shown in FIG. 18, the label 600 is adhesively mounted between the two rows 720, 730 of connector ports. The connector ports 721, 722, 723 in the top row 720 are rotated 180 degrees with respect to the connector ports 731, 732, 733 in the bottom row.

As shown in FIG. 18, when plugs 220 attached to patch cords 200 are inserted into connector ports 721, 731 on network switch 700, the spring-loaded contact pins (e.g., pins 232, 234 on plug 220) line up with a respective one of the pairs of contact pads (e.g., pads 621, 622) on label 700. The length and positioning of the contact pins on the plugs may be designed so that they will make mechanical and electrical contact with the label 600, but will not make mechanical or electrical contact with another network device which does not include a passive label 600.

The label 600 of FIGS. 17 and 18 may operate as follows. In the following illustration, the network switch 700 (only part of which is shown in FIG. 18) may replace one of the switches 42 of FIG. 1, and the patch cord 200 may replace the patch cord 50 of FIG. 1 such that the patch cord 200 connects the connector port 721 of network switch 700 to a connector port 34 on one of the intelligent patch panels 32 of FIG. 1.

When the plug 220' (not visible in FIG. 18) on the far end of the upper patch cord 200 in FIG. 18 is inserted into the connector port 34 of patch panel 32, the detector 170 on patch panel 32 detects the presence of the plug 220', and the microprocessor 190 on patch panel 32 then transmits a signal over conductor 209 of patch cord 200 and a ground reference on conductor 210 of patch cord 200. Once the plug 220 on the other end of patch cord 200 has been inserted into the connector port 721 on network switch 700 (see FIG. 18) the contacts 232 and 234 make mechanical and electrical contact with the contact pads 621 and 622 on the label 600. Thus, the signal and the ground reference are coupled from conductors 209 and 210, respectively, onto the contact pins 232 and 234 of plug 220, respectively, where they are transferred to the contact pads 621 and 622, respectively, on the label 600. The signal from conductor 209 is carried on the trace 623 to the serial ID chip 620 that is associated with connector port 721, and the ground reference from conductor 210 is provided to the serial ID chip 620 over the trace 624. The microprocessor 190 may also supply a voltage of, for example, 3 to 5 volts, to the signal line 209 so that the signal line 209 may also provide an operating voltage that powers the serial ID chip 620. As a result, the serial ID chip 620 need not draw power separately from the network device 700.

Once the plug 220 is plugged into the connector port 721, the serial ID chip 620 can receive control signals that are transmitted by the microprocessor 190. In some embodiments, the microprocessor 190 may periodically transmit a control signal after detecting insertion of a patch cord into one of the connector ports 34 on the patch panel 32 until such time as a response is received (or until a timeout period is reached). In response to receiving such a control signal, the serial ID chip 620 may send a responsive control signal to the microprocessor 190 over the conductor 209 of the patch cord 200. This responsive control signal may include the unique identification number that has been previously programmed into the serial ID chip 620. Thus, the intelligent patching system may determine the patching connectivity with respect to patch cords that are connected between standard network devices such as network switches and patch panels of the intelligent patching system, as passive labels such as the labels 600 may be used to provide an intelligent patching capability to such standard network devices.

As noted above, a trace button 130 may be provided adjacent each connector port 34 on the patch panels 32. When a patch cord 200 is plugged into a particular connector port 34, its associated trace button 130 may be used to quickly and easily identify which connector port on another device such as a network switch 42 the far end of patch cord 200 is plugged into. This feature may be helpful, because in many situations a large number of patch cords extend between adjacent equipment racks, and it may be very difficult to trace patch cord connectivity visually or by hand.

This line tracing capability may operate as follows. When a technician presses one of the trace buttons 130 on patch panel 32, a signal may be delivered to the microprocessor 190. In some embodiments, in response to receiving this signal, the microprocessor 190 may send a control signal over the conductors 209, 210 of patch cord 200 to an LED associated with the connector port which the other end of the patch cord is plugged into (this LED may be on another patch panel 32' in a cross-connect patching system, or on a passive label 600 that is mounted on a network switch 42 in an inter-connect patching system). This signal causes the LED to light up, thereby allowing the technician to quickly and easily identify the connector port which the other end of the patch cord 200 is plugged into. Thus, the trace buttons 130 and LEDs may be used to accurately trace the end points of any patch cord that is connected between a first patch panel 32 and a second patch panel 32' or a network switch 42 that is equipped with passive labels according to embodiments of the present invention.

Referring back to FIG. 1, it will be appreciated that the network switches 42 are typically connected by another set of patch cords 54 to network routers and servers 46 or other end network devices. Pursuant to embodiments of the present invention, passive labels such as the labels 500 of FIGS. 15-16 may be mounted adjacent the connector ports on these end network devices. As a result, the patching systems may collect identification information (e.g., MAC IDs) for end network devices in the same manner that it may collect such identification for end devices in the work areas, with the only difference being that the control communication path to the end network devices runs through passive labels such as the label 600 that are mounted on the network switches, whereas the control communication path to the end devices in the work areas typically runs through modular wall jack assemblies such as the assembly 300 described above.

It will be appreciated that a wide variety of work area end devices and network end devices are in existence. As such, a number of different label designs may be required, with each label designed to fit on specific devices. For example, a first label design may be provided that is configured for use on computers, Internet phones, printers, facsimile machines, PBXs, PDUs, UPSs, etc. that have a very small number of connector ports (e.g., 1-3 connector ports). A second label design may be provided for network devices such as switches and servers that have a single row of RJ-45 connector ports or which have multiple rows of connector ports with all of the connector ports having the same orientation. A third label design may be provided that is configured for use on network devices having pairs of rows of connector ports where the connector ports in adjacent rows are rotated by 180 degrees with respect to each other (as is shown in FIG. 18 above). Numerous additional label designs could also be provided.

Figure 19:
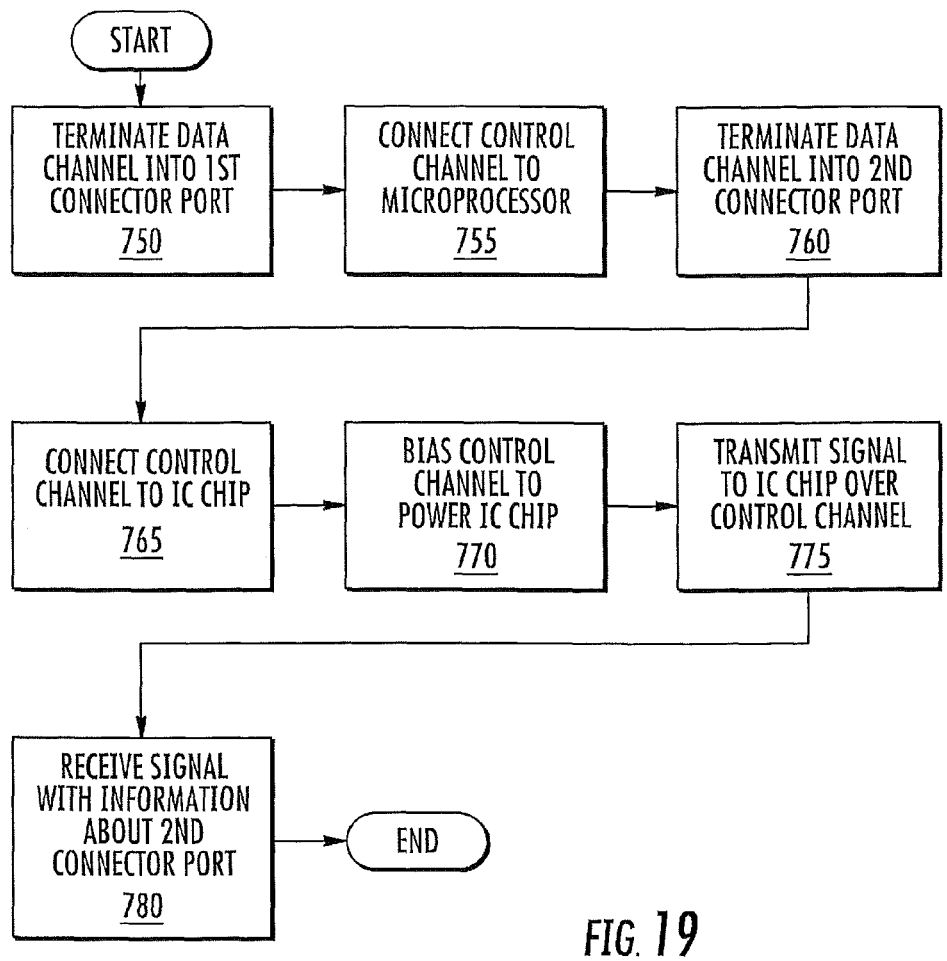
FIG. 19 is a flow chart illustrating methods of automatically identifying work area end devices according to embodiments of the present invention.

FIG. 19 is a flow chart illustrating methods of automatically tracking a communications cable connection between a first connector port of a patch panel and a second connector port such as, for example, a work area modular wall jack assembly. As shown in FIG. 19, operations may begin when a first end of a data communications channel of the communications cable is terminated into the first connector port (block 750). The data communications channel may comprise, for example, a differential pair of conductive wires such as wires 401 and 402 of the communications cable 400 that is described above. The first connector port may comprise, for example, a connector port 34 on patch panel 32, and may be implemented, for example, as an RJ-45 jack such as jack 60 described above. In such embodiments, the wires 401, 402 that form the data communications channel may be terminated into respective wire connection terminals of the RJ-45 jack 60. It will be appreciated that in such embodiments the cable would typically include four data communications channel, and that all four data communications channels would be terminated into the wire connection assembly of jack 60. It will likewise be appreciated that the connector port could be a fiber optic adapter or other connector port besides an RJ-45 jack.

Next, first and second conductors that form the separate control are electrically connected to a microprocessor that is associated with the first patch panel (block 755). In some embodiments, this may involve terminating the conductors 409, 410 of a communications cable such as cable 400 that is described above into wire terminations 66, 68 of an RJ-45 jack 60 that is used as the first connector port (see FIG. 5 and accompanying description above). The second end of the data communications channel of the communications cable may be terminated into a second connector port (block 760). This second connector port may comprise, for example, a modular wall jack assembly such as assembly 300 described above with respect to FIGS. 8-13.

As is further shown in FIG. 19, the first and second conductors that form the separate control channel are electrically connected to an integrated circuit chip associated with the second connector port (block 765). In some embodiments, this integrated circuit chip may comprise a serial ID chip such as, for example, the serial ID chip 336 discussed above. In some embodiments, this connection may be made by terminating the conductors 409, 410 of a communications cable such as cable 400 that is described above into wire terminations 392, 394 of an RJ-45 jack 350 that is used as the second connector port. Once such connectivity is made, the first conductor (e.g., conductor 409) of the separate control channel of the communications cable may be biased to power the integrated circuit chip associated with the second connector port (block 770). Then, a first signal may be transmitted over the separate control channel of the communications cable to the integrated circuit chip associated with the second connector port (block 775). Thereafter, a second signal may be received from the integrated circuit chip over the separate control channel of the communications cable in response to the first signal, the second signal including information regarding the second connector port (block 780). In this fashion, the system may automatically track the horizontal cabling connection between the first connector port on the patch panel and the second connector port by receiving identification information associated with the second connector port.

Figure 28:
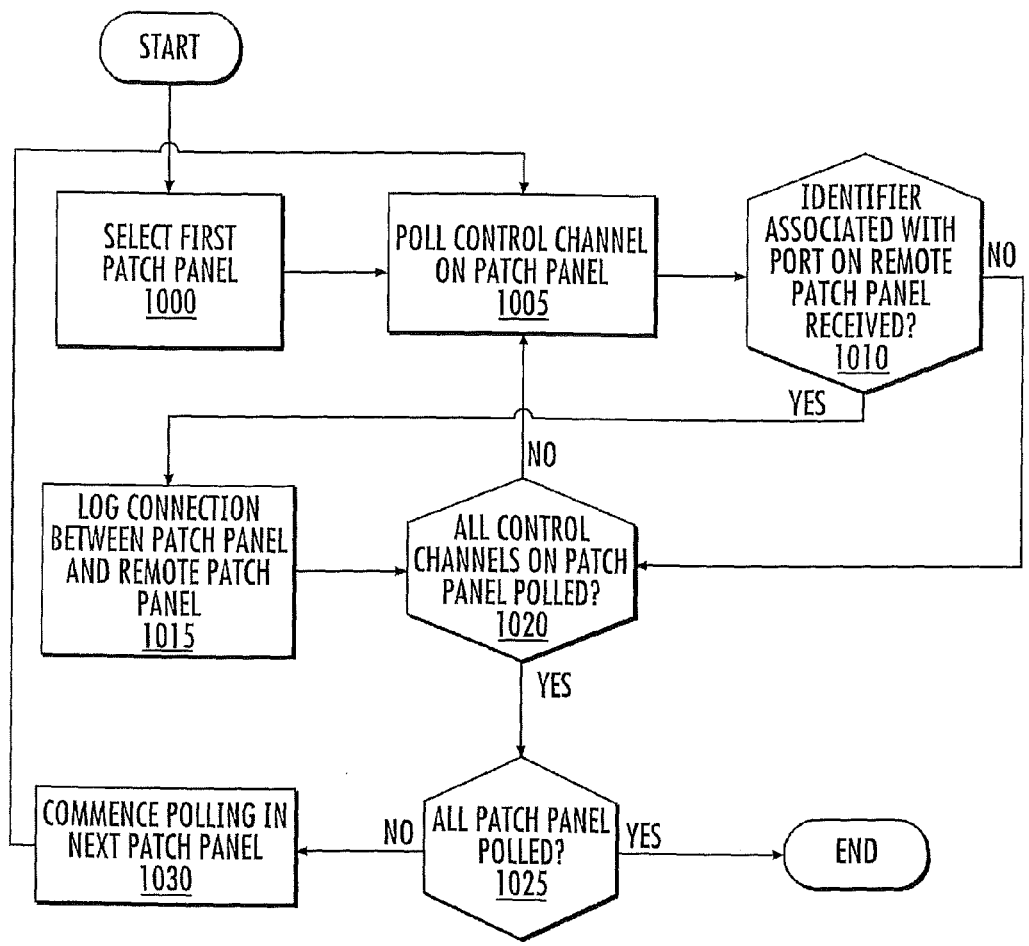
FIG. 28 is a flow chart illustrating methods of automatically discovering the backbone cabling between patch panels according to embodiments of the present invention.

FIG. 28 is a flow chart illustrating methods of automatically discovering the backbone cabling between patch panels according to embodiments of the present invention. As shown in FIG. 28, operations may begin with the selection of a first patch panel in the communications patching system (block 1000). A controller such as the microprocessor on the selected patch panel may then serially poll a first of the control channels on the selected patch panel (block 1005). As discussed above, a control channel may be associated with each connector port on the selected patch panel. The polling may comprise transmitting a control signal over the control channel. If the connector port associated with the control channel is connected by a backbone cable according to embodiments of the present invention to a connector port on another patch panel, the control signal will energize the serial ID chip associated with this remote connector port. If this occurs, the remote serial ID chip will transmit a responsive control signal over the control channel that contains a unique identifier associated with the connector port on the remote patch panel (e.g., a MAC ID of the remote patch panel and a port number of the connector port).

As shown in FIG. 28, if such a responsive control signal is received (block 1010), then the connection between the connector port on the selected patch panel and the connector port on the remote patch panel may be automatically logged in a connectivity database (block 1015). After the logging of the connectivity information has occurred (if any), a determination is made as to whether or not all of the control channels on the selected patch panel have been polled (block 1020). If not, operations return to block 1005 so that the next control channel on the selected patch panel may be polled, and any backbone cabling connectivity associated with that control channel discovered and logged. Once all of the control channels on the selected patch panel have been polled, a determination is made as to whether or not all of the patch panels in the patching system have conducted the above-described polling operation (block 1025). If they have not, a different patch panel is selected (block 1030), and operations return to block 1005. Once all of the patch panels in the patching system have conducted the above-described polling operation (block 1025), operations may end, as the backbone cabling connectivity will have been fully discovered.

Figure 20:
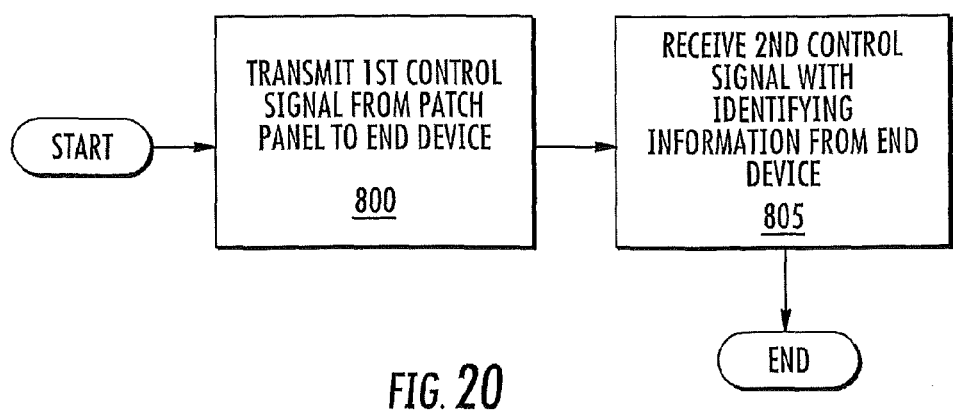
FIG. 20 is a flow chart illustrating methods of automatically tracking horizontal cabling connections according to embodiments of the present invention.

FIG. 20 is a flow chart illustrating methods of automatically identifying an end device that is connected to a local area network according to embodiments of the present invention. As shown in FIG. 20, operations may begin with a first control signal being transmitted over a control channel that runs from a first connector port on a patch panel to an integrated circuit chip mounted on the end device through at least a communications cable, a second connector port and a patch cord (block 800). In response to this first control signal, a second control signal is received from the integrated circuit chip over the control channel, the second signal including identifying information for the end device (block 805). In some embodiments, the integrated circuit chip may be a first serial ID chip, and the identifying information may comprise a MAC ID, a serial number, as asset tag or other identifying information.

In some embodiments, the second connector port may include (1) a second serial ID chip that is electrically connected to the control channel and/or (2) a sensor that is configured to detect when a patch cord is plugged into the second connector port. In such embodiments, the first control signal may be transmitted in response to determining that the patch cord was plugged into the second connector port. The above-described methods may also include the step of providing power to the integrated circuit chip by a first conductive path of the control channel to a voltage sufficient to power the integrated circuit chip.

Figure 21C:
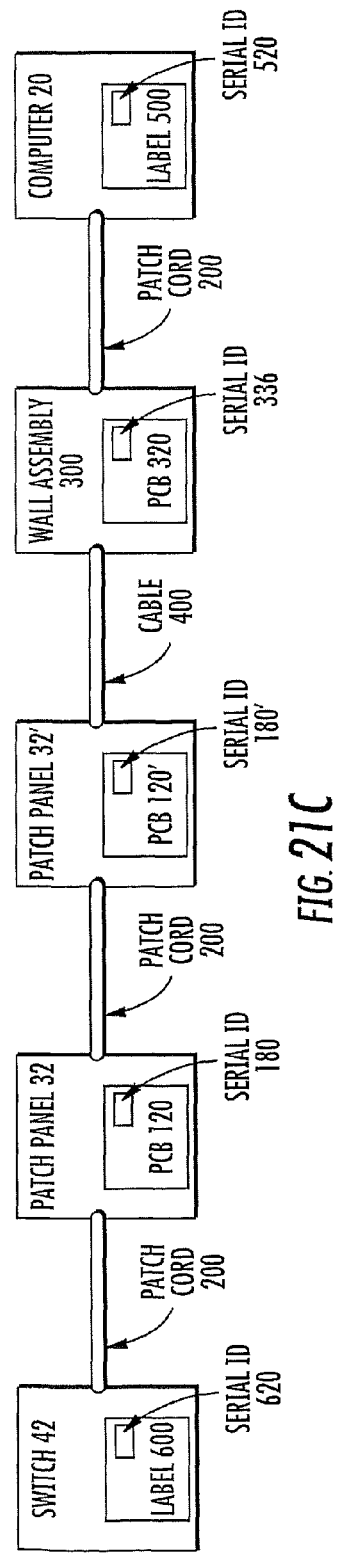

FIGS. 21A-21D are schematic block diagrams illustrating the communications links included in patching systems according to various embodiments of the present invention. In particular, FIG. 21A illustrates the communications links from a network switch to an end device in work area which may be used, for example, in an office building environment that has an inter-connect style patching system. As shown in FIG. 21A, a passive label such as label 600 that includes a serial ID chip 620 is mounted adjacent to a connector port (not shown) on a network switch such as switch 42. A patch cord such as the patch cord 200 is used to connect the connector port on the network switch 42 to a connector port 34 (not shown) on an intelligent patch panel 32. A serial ID chip 180 is also provided on the intelligent patch panel 32 that is associated with the connector port 34 that receives the patch cord 200. A cable according to embodiments of the present invention such as the cable 400 is attached to the back end wire assembly of the connector port 34 on the intelligent patch panel 32. The other end of this cable 400 is attached to the back end wire assembly of a wall-mounted modular jack assembly 300. The wall mounted modular jack assembly 300 includes a third serial ID chip 336. Another patch cord 200 according to embodiments of the present invention is used to connect the wall mounted modular jack assembly 300 to a connector port (not shown) of an end device in the work area such as, for example, a computer 20. A passive label according to embodiments of the present invention such as label 500 that includes a fourth serial ID chip 520 is mounted adjacent the connector port on the work area end device 20. As discussed above, with the above arrangement is possible to automatically monitor and track in real time the end-to-end connectivity from the connector port on network switch 42 to the connector port on the work area end device 20.

FIG. 21B illustrates the communications links that may be included when the systems according to embodiments of the present invention are implemented in a data center environment that has an inter-connect style patching system. As shown in FIG. 21B, the connectivity may be identical to the connectivity shown in FIG. 21A above with two exceptions. First, in the data center environment, the connectivity to end devices is typically made through connector ports on intelligent patch panels 32 as opposed to through wall mounted modular jack assemblies 300 as is the case in the office building environment. Second, in the data center environment, the end devices will typically comprise a server, data storage device, environmental monitoring equipment, or the like that includes a passive label and serial ID chip instead of to a work area end device such as a computer or printer as is the case in the office building environment.

FIG. 21C illustrates the communications links that may be included when the systems according to embodiments of the present invention are implemented in an office building environment that uses a cross-connect style patching system. As shown in FIG. 21C, a passive label such as label 600 that includes a serial ID chip 620 is mounted adjacent to a connector port (not shown) on a network switch 42. A patch cord according to embodiments of the present invention such as patch cord 200 is used to connect the connector port on the network switch 42 to the back end wire assembly of a connector port 34 (not shown) on a first intelligent patch panel 32 (note that only the end of the patch cord that plugs into the connector port on the network switch will include a plug termination). A second serial ID chip 180 is provided on the first intelligent patch panel 32 that is associated with the connector port 34 that receives the patch cord 200. A second patch cord 200 according to embodiments of the present invention is used to connect the connector port 34 on the first intelligent patch panel 32 to a connector port 34' (not shown) on a second intelligent patch panel 32'. A third serial ID chip 180' is provided on the second intelligent patch panel 32' that is associated with the connector port 34' that receives the patch cord. A cable according to embodiments of the present invention such as cable 400 is attached to the back end wire assembly of the connector port 34' on the second intelligent patch panel 32'. The other end of this cable 400 is attached to the back end wire assembly of a wall-mounted modular jack assembly such as assembly 300. The wall mounted modular jack assembly 300 includes a fourth serial ID chip 336. Another patch cord 200 according to embodiments of the present invention is used to connect the wall mounted modular jack assembly 300 to a connector port (not shown) on an end device in the work area such as, for example, a computer 20. A passive label according to embodiments of the present invention such as label 500 that includes a fifth serial ID chip 520 is mounted adjacent the connector port on the work area end device 20. As discussed above, with the above arrangement it is possible to automatically monitor and track in real time the end-to-end connectivity from the connector port on the network switch 42 to the connector port on the work area end device 20.

Figure 21D:
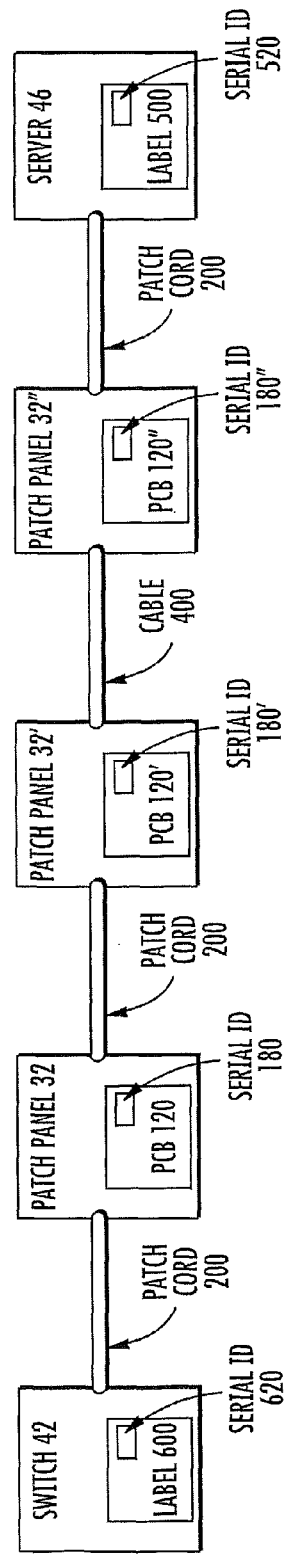

FIG. 21D illustrates the communications links that may be included when the systems according to embodiments of the present invention are implemented in a data center environment that has a cross-connect style patching system. As shown in FIG. 21D, the connectivity may be identical to the connectivity shown in FIG. 21C above with two exceptions. First, in the data center environment, the connectivity to end devices is typically made through connector ports on intelligent patch panels as opposed to through wall mounted modular jack assemblies as is the case in the office building environment, and hence the wall mounted jack assembly 300 of FIG. 21C is replaced in FIG. 21D with a third intelligent patch panel 32". Second, in the data center environment, the end devices will typically comprise a server, router, or the like that includes a passive label and serial ID chip instead of to a work area end device such as a computer or printer as is the case in the office building environment.

Figure 22:
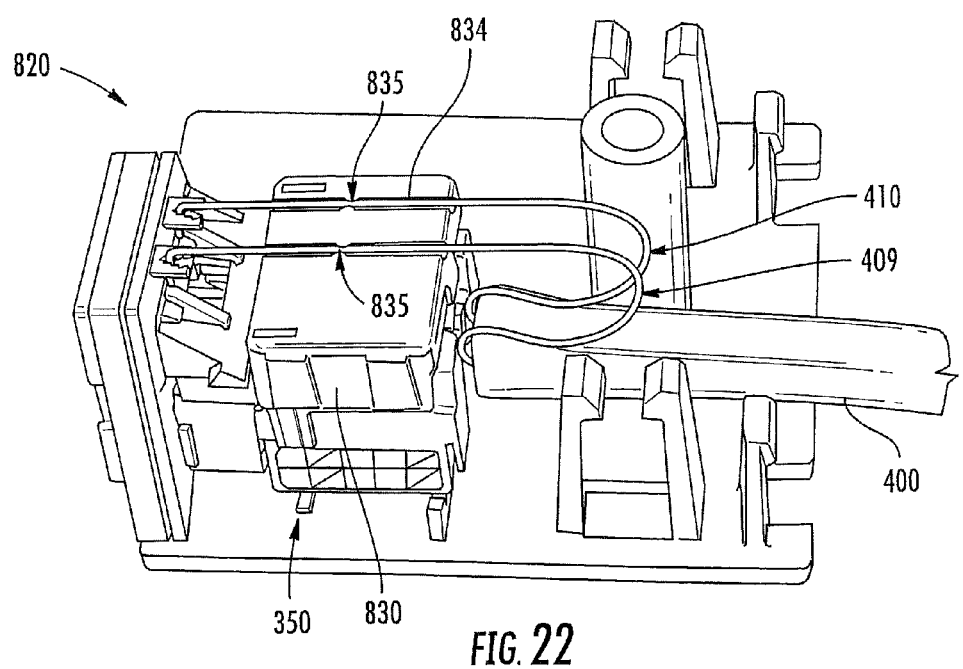
FIG. 22 is a perspective view of a modular wall jack assembly according to further embodiments of the present invention.

FIG. 22 illustrates a modular wall jack assembly 820 according to further embodiments of the present invention.

As shown in FIG. 22, the assembly 820 may be nearly identical to the assembly 300 described above, except that the stuffer cap 390 of assembly 300 is replaced with a stuffer cap 830 that includes conductor paths 832, 834, and the rear printed circuit board 340 includes a pair of IDCs 836, 838. When a technician terminates the cable 400 onto the jack 350 of the jack assembly 820 of FIG. 22, the conductors 409, 410 are cut to extend from the end of the cable 400 about an inch or two farther than the remaining conductors 401-408. The extended portion of conductors 409, 410 are then snapped into the conductor paths 832, 834, respectively. The conductor paths 832, 834 may include one or more protrusions 835 which hold the respective conductors 409, 410 in place within the conductor paths 832, 834. The ends of conductors 409, 410 may then be terminated into the IDCs 836, 838, respectively, to provide the electrical connection between the conductors 409, 410 and the rear printed circuit board 340. This design allows for a simpler stuffer cap 830 that may be injection molded, although it may require a more complicated process for cutting the cable 400.

Figure 23:
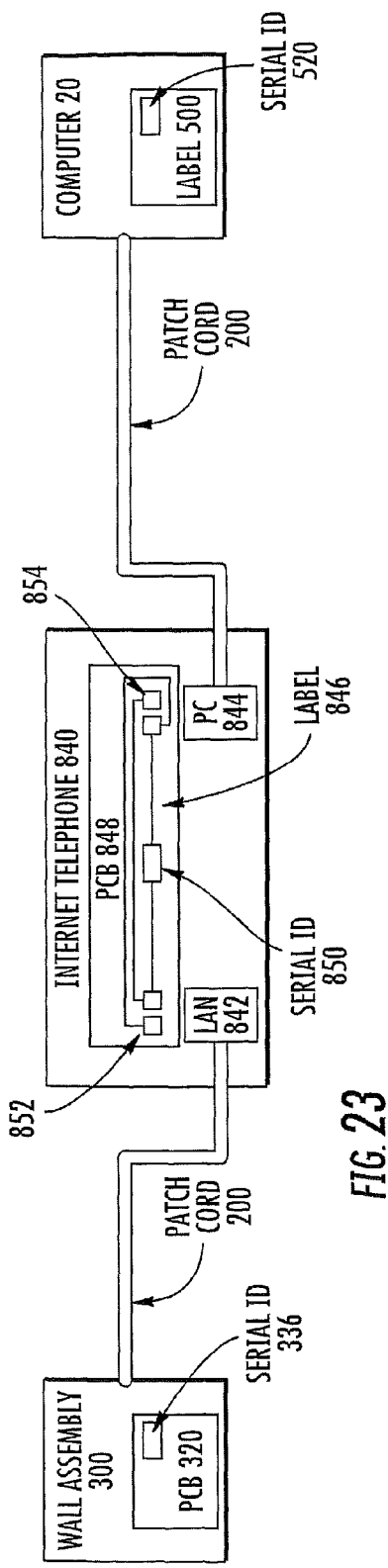
FIG. 23 is a schematic block diagram that illustrates how a work area computer may be connected to a modular wall jack assembly through an Internet telephone using a passive bridging label according to embodiments of the present invention.

According to still further embodiments of the present invention, multiple end devices that are on the same channel may be tracked. In particular, some work area end devices such as Internet telephones may include a bridging port. One example of such a device is illustrated in FIG. 23, which shows how a work area computer 20 may be connected to a modular wall jack assembly 300 via two patch cords 200 and an Internet telephone 840 that includes both a local area network ("LAN") connector port 842 and a "PC" connector port 844. A passive "bridging" label 846 according to embodiments of the present invention is mounted adjacent the two connector ports 842,844 on the Internet telephone 840. This bridging label 846 includes a printed circuit board 848, a single serial ID chip 850, a pair of contact pads 852 that are above connector port 842 and a pair of contact pads 854 that are above connector port 844. The contact pads 852 above the LAN connector port 842 are electrically connected via the printed circuit board 848 to respective of the contact pads 854 above the "PC" connector port 844, thereby providing a communication path for the conductors 209, 210 of the first patch cord 200 that connects the modular wall jack assembly 300 to the LAN connector port 842 on the Internet telephone 840 to the conductors 209, 210 of the second patch cord 200 that connects the PC connector port 844 on the Internet telephone 840 to the computer 20. In this manner, control communications may be carried through the Internet telephone 840 to a passive label 500 on the computer 20. The serial ID chips 850, 520 on the bridging label 846 and on the passive label 500 may serially respond to a control communications transmitted over the conductors 209, 210 on the first and second patch cords 200, thereby allowing the system to automatically track multiple work area end devices (i.e., Internet telephone 840 and computer 20) that are connected to the network through a single modular wall jack assembly 300.

Pursuant to further embodiments of the present invention, enhanced network security may be achieved through the use of passive labels 500 with serial ID chips 520 that are mounted on end devices. Currently, MAC ID filtering is often used to prevent unauthorized access of end devices to the network. With MAC ID filtering, a connector port on a network switch may be configured to only allow MAC IDs within a certain range. If an end device having a MAC ID outside of the authorized range attempts to connect to the network via the switch connector port, the connector port automatically shuts down and a system administrator is notified. The system administrator may then determine whether or not the end device should be given access to the network, and may reprogram the connector port on the switch to accept the MAC ID of the end device if the end device should be allowed access. Network access control technology may also be used instead of MAC filtering to enforce corporate network security policies for access to a network.

As discussed above, pursuant to embodiments of the present invention, it may be possible to automatically identify the MAC ID of end devices that are connected to a network by mounting passive labels such as label 500 with serial ID chips 520 on the end devices. In some embodiments, the network switches that are not in use could be set to a disabled state. When the system discovers that a new end device has been connected to the network, the system can determine the MAC ID of the end device and compare that MAC ID to a list of approved devices. If the MAC ID is included on the approved list, the system would then enable the switch port, thereby providing the end device access to the network. In this manner, the network could automatically only provide access to approved devices, providing enhanced network security as compared to current MAC ID filtering or network access control techniques. In some embodiments, the switch port will only be automatically enabled if the MAC ID of the end device is on an authorized list of MAC IDs. In other embodiments, the switch port may be automatically enabled for any device having a passive label with a serial ID chip thereon, regardless of the specific MAC ID of the end device. The ability to only enable a particular connector port on a network switch upon detecting that an end device has been connected to the connector port (through cabling and intermediate jacks) may result in power savings, particularly in the data center environment. Additionally, the communications systems according to embodiments of the present invention also provide the ability to set network access policies based on the physical location of a device that is trying to connect to the network. This capability generally cannot be achieved using conventional MAC filtering or network access control techniques.

Moreover, since the system can track the MAC IDs or other identifying information associated with the end devices, this identifying information may be used to restrict the access of certain devices to particular resources within the network. The MAC IDs or other information stored on the serial ID chips that are provided on the passive labels that are mounted on end devices may also be used to identify a specific service that needs to be provided to a connected device. The system could automatically be reconfigured to assign the required service to the switch port to which the end device is connected. By way of example, an Internet telephone typically requires access to Voice Over Internet Protocol ("VOIP") service. Upon detecting by, for example, by a MAC ID, that an Internet telephone has been connected to a particular switch port, the system can cause a virtual local area network ("VLAN") to provision VOIP service to the identified switch port. Thus, by automatically tracking the MAC IDs of end devices, the system can be configured to automatically provision certain services to connector ports on network switches in response to end devices being connected to the network, thereby avoiding the need to manually perform such provisioning operations.

Figure 24:
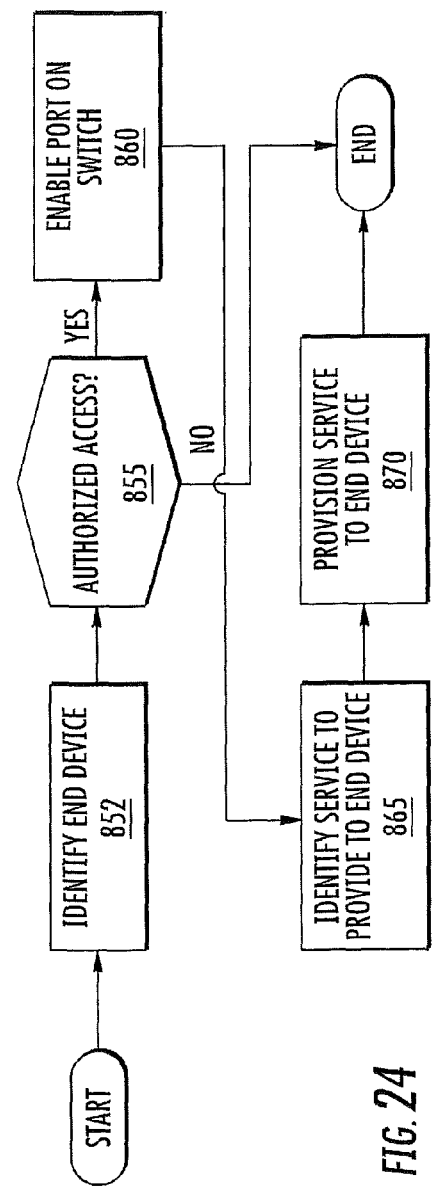
FIG. 24 is a flow chart illustrating methods of automatically provisioning services to a connector port on a network switch according to embodiments of the present invention.

FIG. 24 is a flow chart illustrating methods of automatically provisioning services to a connector port on a network switch according to embodiments of the present invention. As shown in FIG. 24, operations may begin with the system automatically identifying an end device that is connected to the network switch via a communications channel (block 852). This may be accomplished, for example, using the methods and systems described above that allow for the system to automatically identify work area end devices. Next, in some embodiments, a determination may be made as to whether or not the identified end device is authorized access to the network switch (block 855). If it is not, operations may end. If the end device is authorized access at block 855, then the connector port on the network switch may be automatically enabled (block 860). Next, a service that should be provided to the end device may be automatically identified (block 865). This may be accomplished, for example, by reference to a database that identifies specific services that are to be assigned to specific types of devices (e.g., VOIP service to Internet telephones), specific services that are to be assigned to specific devices, specific services that are to be assigned to devices located in certain locations (e.g., computers located in a secure part of a building are provided access to a secure server) or some combination of the above. Then, the identified services may be automatically provisioned to the connector port on the network switch (block 870).

Figure 25:
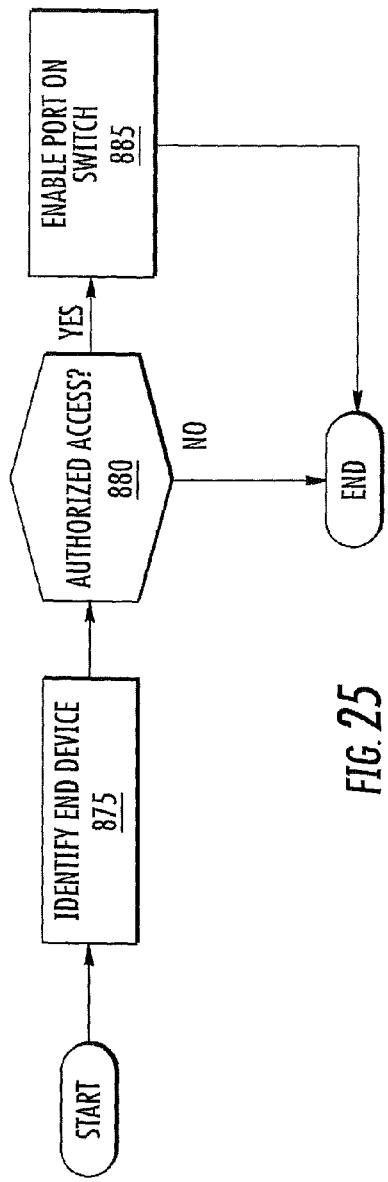
FIG. 25 is a flow chart diagram illustrating methods for automatically enabling a connector port on a network switch pursuant to embodiments of the present invention.

Pursuant to still further embodiments of the present invention, methods for automatically enabling a connector port on a network switch are provided. FIG. 25 is a flow chart diagram illustrating one embodiment of these methods. As shown in FIG. 25, operations may begin with the system automatically identifying an end device that is connected to the network switch (block 875). Then, a determination is automatically made as to whether or not the identified end device is authorized access to the network switch (block 880). If it is not, operations may end. If it is, the connector port on the network switch may then be automatically enabled (block 885), and then operations may end.

Pursuant to further embodiments of the present invention, the above-described modular wall jack assemblies 300 may be used to facilitate administering network changes ordered by paper or electronic work orders. By way of example, when a computer or other device is to be installed in an office of an office building, a work order may be generated that requests that an administrator (1) complete a patching connection that connects a modular wall jack in the office to a connector port on a network switch, (2) enable the connector port on the network switch and (3) provision any required services to the connector port on the network switch. In many instances, the office may have multiple modular wall jacks (e.g., two to six wall jacks mounted on one or two faceplates). Once the network switch is connected, enabled and provisioned, an administrator (or the system) could light up the LED (or activate some other indicator) associated with the modular wall jack in the office that has physical connectivity to the connector port on the network switch in order guide an end user or technician to the appropriate modular wall jack that the computer should be connected to via a patch cord. The LED is lit by biasing the control channel that extends from the connector port on the network switch, through a patch cord to a connector port on a patch panel, and through horizontal cabling to the modular wall jack at a voltage that is appropriate to activate the LED.

Figure 26:
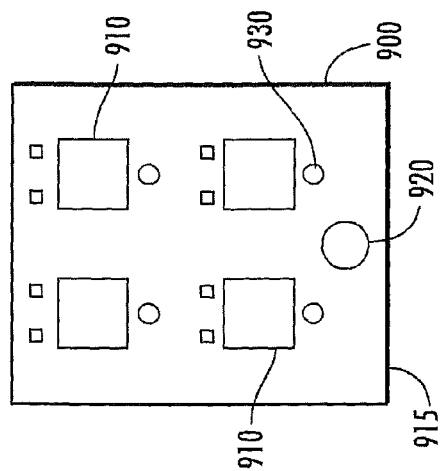
FIG. 26 is a schematic front view of a modular wall jack assembly according to further embodiments of the present invention.

In still further embodiments of the present invention, modular wall jack assemblies 900 are provided that include multiple modular wall jacks 910. FIG. 26 is a schematic front view of one such assembly 900. As shown in FIG. 26, each modular wall jack 910 may have a pair of contacts and an LED 930, and may otherwise be configured like the modular wall jack assembly 300 of FIGS. 8-13, except that multiple modular wall jacks 910 are mounted in each assembly 900. In addition, a trace button 920 may also be provided in the faceplate 902. The trace button 920 may be mounted on a common printed circuit board 915 that serves as the front printed circuit board for each of the modular wall jacks 910. In some embodiments, this trace button 920 may be used to light up the LED 930 associated with the modular wall jack 910 that has connectivity to an enabled network switch in order to guide an end user to connect an end device to the correct one of the multiple modular wall jacks 910. In particular, when an operator presses the trace button 920, a signal is transmitted to the microprocessor 190 on patch panel 32. The microprocessor 190 will light up the LED 930 associated with one (or all) of the modular jacks 910 that has connectivity to an enabled connector port on a network switch.

The LEDs 326 that are provided on work area modular wall jack assemblies may also be used to facilitate unscheduled connectivity changes in a work area. By way of example, an end user may bring a personal laptop to work and need to connect the laptop to the network. To accomplish this, the end user may contact a computer help desk or computer administrator and request that network access be provided. In response to such a request, the network administrators may enable a network switch and provide patching connectivity from that switch to a modular wall jack in the end user's office. Once this has been accomplished, the administrator may remotely light up the LED 326 associated with the particular modular jack in the office which has been connected to the switch. Likewise, in some embodiments, a trace button (not shown in FIGS. 8-13) may be provided on the front faceplate of modular wall jack assembly 300, and activation of this trace button may automatically light the LEDs 326 on jacks 350 which are connected to an enabled switch port.

As discussed above, in some embodiments of the present invention, multiple intelligent patch panels may connect to the same end-to-end control channel between, for example, a network switch and a modular wall jack or even between an end network device such as a server and a work area end device such as a personal computer or printer. This can be seen, for example, with reference to FIG. 7 which shows how a work area computer 20 is connected to a network server 46 through a communications path that runs through both a connector port 34 of a first intelligent patch panel 32 and through a connector port 34' of a second intelligent patch panel 32'. If both intelligent patch panels 32, 32' connect to the same end-to-end control channel between, for example, computer 20 and network server 46, large and potentially damaging currents may flow across the ground lead of the control channel.

In particular, as discussed above with respect to FIG. 3, each intelligent patch panel 32, 32' may connect the ground lead of each serial ID chip on the panel to a local ground reference on the microprocessor 190 or elsewhere on the printed circuit board 120 that is mounted on the patch panel 32, 32'. If there is any variation in the local ground reference, a current will flow across the ground lead of the control channel as a result of this difference in potential. When the patch panels 32, 32' are mounted on different equipment racks that are powered by separate power units, a difference in the local ground references may easily occur, which can result in very high, and potentially destructive currents, flowing across the ground lead of the control channel.

Figure 27:
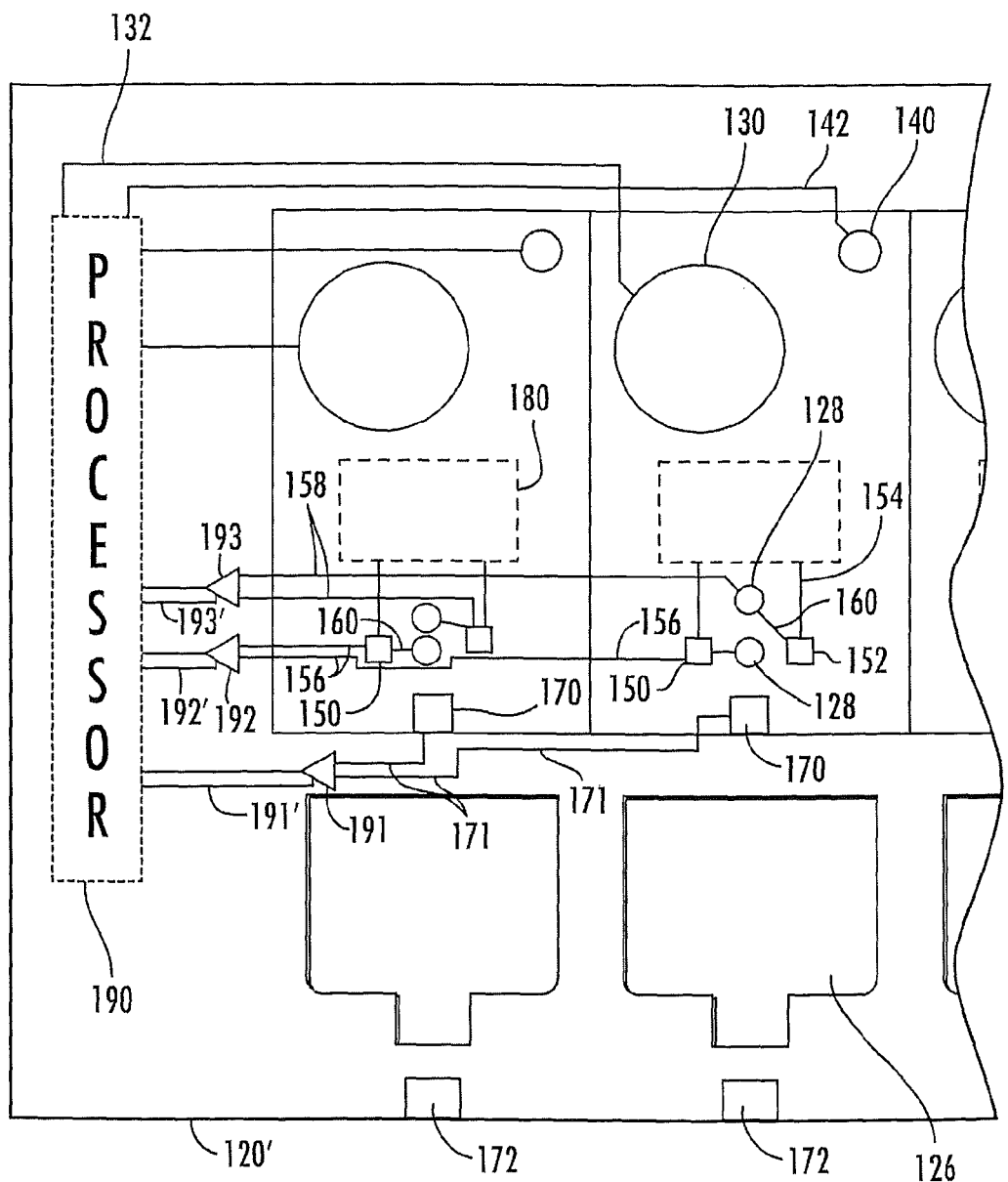
FIG. 27 is a schematic front view of a portion of another front printed circuit board that could be used on the intelligent patch panel of FIG. 2.

FIG. 27 is an enlarged schematic front view of a portion of a modified printed circuit board 120' for the intelligent patch panel 32 of FIGS. 1-2. The front printed circuit board 120' includes a plurality of connector port openings 126 that each provide access to a respective one of the connector ports 34 of the patch panel 32. A trace button 130, an LED 140, a pair of contact pads 150, 152, a detector 170, an emitter 172 and a serial ID chip 180 are mounted on the front printed circuit board 120 either above or below each one of the connector port openings 126, and a single microprocessor 190 is also mounted on the printed circuit board 120'. As with the printed circuit board 120, a first set of printed circuit board traces 171 is provided, each of which connect to a respective one of the detectors 170, a second set of printed circuit board traces 154 is provided, each of which connect one of the contact pads 150 or 152 to respective ones of the two pins that are provided on each of the serial ID chips 180.

Printed circuit board 120' differs from printed circuit board 120 of FIG. 3 in that printed circuit board 120' includes first through third analog multiplexers 191-193. Each of the first set of printed circuit board traces 171 connect one of the detectors 170 to a respective one of the input ports of multiplexer 191, and the output port of multiplexer 191 is connected to microprocessor 190. A control line 191' allows the microprocessor 190 to control multiplexer 191 to connect a selected one of the detectors 170 to the microprocessor 190. Similarly, each of the third set of printed circuit board traces 156 connect one of the contact pads 150 to a respective one of the input ports of multiplexer 192, and the output port of multiplexer 192 is connected to microprocessor 190. A control line 192' allows the microprocessor 190 to control multiplexer 192 to connect a selected one of the contact pads 150 to the microprocessor 190. Likewise, each of the fourth set of printed circuit board traces 158 connect one of the contact pads 152 to a respective one of the input ports of multiplexer 193, and the output port of multiplexer 193 is connected to microprocessor 190. A control line 193' allows the microprocessor 190 to control multiplexer 193 to connect a selected one of the contact pads 152 to a ground reference on the microprocessor 190 (or elsewhere on the front printed circuit board 120).

The firmware/software controlling the system may be designed so that the analog multiplexers 192 and 193 are controlled in tandem so that they always selected the inputs that are connected to the contact pads 150, 152 that are part of the same pair of contact pads 150, 152. Thus, in this fashion, the control channel associated with a single one of the connector ports 34 would be connected to the microprocessor 190 at any one time. The system firmware/software may also be configured to coordinate the multiplexers 192, 193 on different patch panels 32, 32' such that the microprocessor 190 on only one patch panel 32, 32' would ever connect to any particular control channel at a given time, so as to avoid creating a ground loop by connecting the microprocessors 190 on two patch panels 32 or 32' to the same control channel simultaneously. It will also be appreciated that in other embodiments circuitry other than multiplexers 192, 193 could be used. For example, in further embodiments, tri-stated line drivers may be used.

While the communications patching systems and the components thereof have primarily been described above with respect to a few exemplary embodiments, it will be appreciated that numerous modifications are also within the scope of the present invention. For example, connections other than the connection contacts 232 could be used to electrically connect the front and rear printed circuit boards 320, 340 of the modular wall jack assembly 300, such as, for example, a jumper cable connection. In still other embodiments, the front and rear printed circuit boards 320, 340 could be replaced with a double-sided printed circuit board or with a flexible printed circuit board, or with a single sided printed circuit board.

As another example, in some embodiments, the passive labels such as label 600 that are mounted on network devices may include one or more LEDs that are mounted on the front side of the printed circuit board 610 (e.g., with an LED provided for each connector port on the device on which the label 600 is mounted). Conductive trace pairs may also be provided on the printed circuit board 610 that connect each LED to the contact pads (e.g., contact pads 621, 622) on the label 600 for the connector port associated with the LED, so that power may be provided to each LED. In this fashion, the separate control channel of a patch cord that is received within one of the connector ports on the network device may also be used to carry a power signal that is used to light the LED that is associated with the connector port at issue on the network device. Each such LED may be activated and used in the same manner that the LEDs 326 on the modular wall jack assemblies 300 may be activated and used.

As another example, while the printed circuit board 120 of patch panel 32 includes infrared detectors 170 and infrared emitters 172, it will be appreciated that, in other embodiments of the present invention, these components may be omitted. In such embodiments, the microprocessor 190 may periodically send a signal to all of the connector ports 34 for transmission over the control channel of any patch cords that are plugged into the connector ports 34. Thus, pursuant to such embodiments, the design of the printed circuit board 120 of patch panel 32 may be simplified, but at the expense of additional signalling that is used to periodically send a signal to every connector port 34 that is then transmitted over any patch cord that is plugged into a particular connector port 34 to determine the connector ports that the far end of any such patch cords are plugged into (e.g., connector ports 34' on a patch panel 32' or connector ports 44 on a network switch 42). [0173] As yet another example, the spring-loaded pins on the termination caps could be replaced with elastomeric connectors.

If a patch cord 200 is connected between a connector port on a network device that includes a passive label having LEDs as described above and a connector port on an intelligent patch panel 32, an operator may press (i.e., activate) the trace button 130 associated with the connector port 34 on patch panel 32. When this occurs, the microprocessor 190 of patch panel 32 may provide a power signal that is carried to the LED on the passive label over the patch cord 200. In this fashion, the operator may use the trace button on the patch panel 32 to light the LED on the passive label to facilitate quickly and easily locating both ends of the patch cord 200.

The communications patching systems according to embodiments of the present invention may be designed so that the discovery or verification of the unique identifier on the serial ID chips may be triggered in a number of different ways. For example, in some embodiments, control signals may be sent to the serial ID chips in response to the detection that a patch cord has been plugged into a connector port (either on a patch panel or at a modular wall jack assembly). In other embodiments, a rack controller that controls the microprocessors on all of the patch panels and other equipment mounted on a particular equipment rack could perform routine status checks that are used to verify the accuracy of the stored connectivity data by serially sending control signals over each patch cord and cable that is connected to the connector ports on the patch panels and/or other equipment that is mounted on the equipment rack. In still other embodiments, system management software that is, for example, used to control rack managers in the system and/or microprocessors such as the microprocessors 190 on the patch panels 32 could be set up to run periodic checks in order to verify the accuracy of the stored connectivity data by serially sending control signals over the patch cords/cables that are connected to the patch panels and/or network equipment that include the functionality according to embodiments of the present invention. Thus, it will be appreciated that a wide variety of mechanism may be used to trigger the functionality of the intelligent patch panels, patch cords, cables and labels according to embodiments of the present invention.

While embodiments of the present invention have been primarily described above with respect to copper patch panels and patch cords that use twisted wire pairs for the data channel(s), it will be appreciated that according to further embodiments of the present invention, the same techniques may be applied with respect to fiber optic patch panels, network devices and patch cords. Thus, it will be appreciated that the connector ports described herein may also be fiber optic adapters as opposed to, for example, RJ-45 jacks. It will also be appreciated that when the connector ports of embodiments of the present invention are implemented as fiber optic adapters, the "input" to the connector port comprises a first plug aperture of the fiber optic adapter and the "output" of the connector port comprises the second plug aperture of the fiber optic adapter that is opposite the first plug aperture. These first and second plug apertures (and additional features of the fiber optic adapter) act to align the fibers in the first and second patch cords that are plugged into opposite sides of the adapter to provide a communications path between fibers in the first patch cord with respective fibers in the second patch cord.

Communications patching systems according to embodiments of the present invention may offer a number of advantages over prior art systems. As noted above, passive labels may be applied to network switches, wall jacks and even to end devices such as computers, printers, internet telephones, servers and the like so as to allow for automatic end-to-end tracking of patching connections.

Additionally, while the serial ID chip tracking features according to embodiments of the present invention may use a special patch cord that includes ninth and tenth wires, the patch panels, wall jacks, equipment jacks according to embodiments of the present invention may work equally well with standard patch cords—they just will not have the serial ID chip tracking capabilities when such standard patch cords are used. The same is true with respect to switches, wall jacks, servers, routers and other network devices that have passive labels according to embodiments of the present invention mounted thereon.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:
1. An intelligent connector port assembly, comprising:
 a connector port having a plug aperture that is configured to electrically connect a data communications channel of a patch cord that is connected to an input of the connector port to a data communications channel of a communications cable that is connected to an output of the connector port;
 an integrated circuit chip;

a first pair of contacts mounted adjacent the plug aperture that are configured to mate with a pair of contacts on the patch cord when the patch cord is received within the plug aperture;

a second pair of contacts that are configured to mate with a pair of conductors in the communications cable that form a control channel;

wherein at least a first contact of the first pair of contacts and a first contact of the second pair of contacts are electrically connected to the integrated circuit chip.

2. The connector port assembly of claim 1, wherein the input of the connector port comprises a plurality of input contacts and the output of the connector port comprises a plurality of output contacts, and wherein the second pair of contacts comprises a pair of insulation displacement contacts.

3. The connector port assembly of claim 2, wherein the connector port comprises an RJ-45 jack having a termination cap, and wherein the termination cap includes a pair of spring loaded pins that are configured to engage respective ones of the second pair of contacts when the termination cap is mounted on a back-end wire connection assembly of the RJ-45 jack.

4. The connector port assembly of claim 2, wherein the connector port comprises an RJ-45 jack having a termination cap, and wherein the termination cap includes a conductor routing assembly for routing the pair of conductors in the communications cable that form the control channel to the second pair of contacts.

5. The connector port assembly of claim 1, wherein the connector port comprises fiber optic adapter.

6. The connector port assembly of claim 1, wherein the connector port is a work area outlet that is mounted within a faceplate, the connector port assembly further comprising a first printed circuit board, wherein the first pair of contacts is mounted on the first printed circuit board on the front side of the faceplate while the connector port extends rearwardly from a rear side of the faceplate.

7. The connector port assembly of claim 6, wherein the first pair of contacts comprise a pair of contact pads.

8. The connector port assembly of claim 6, further comprising a second printed circuit board and a pair of connection contacts, wherein the second pair of contacts is mounted on the second printed circuit board, and wherein the pair of connection contacts electrically connect the first and second printed circuit boards.

9. The connector port assembly of claim 6, further comprising an LED that is electrically connected to the pair of conductors in the communications cable that form the control channel via the second pair of contacts.

10. The connector port assembly of claim 9, wherein the LED is configured to display a status of a circuit that is connected through the connector port.

11. The connector port assembly of claim 9, wherein the LED is configured to emit light if the connector port has full end-to-end connectivity to a switch port.

12. The connector port assembly of claim 11, wherein the LED is configured to emit light if the connector port has full end-to-end connectivity to an enabled switch port.

13. The connector port assembly of claim 9, wherein the LED is configured to automatically emit light in response to generation of an electronic work order that calls for a patch cord to be inserted into the connector port.

14. The connector port assembly of claim 9, wherein the LED is configured so that it can be lit remotely by a system administrator.

15. The connector port assembly of claim 9, further comprising a status button that is mounted on the first printed circuit board, wherein the status button is configured to cause the LED to indicate a circuit status when the status button is activated.

16. The connector port assembly of claim 6, further comprising a spring-loaded shutter that is mounted to cover the plug aperture, the shutter including a contact that mates with a shutter contact on the first printed circuit board when the shutter is in its closed position.

17. The connector port assembly of claim 16, wherein the shutter contact is configured to act as a sensor for determining if a patch cord is plugged into the plug aperture.

18. The connector port assembly of claim 1, wherein the second pair of contacts comprises a pair of insulation displacement contacts.

19. The connector port assembly of claim 18, wherein the connector port is mounted in a faceplate in a work area, and wherein the communications cable electrically connects the connector port to a patching system.

20. The connector port assembly of claim 19, wherein the first pair of contacts are on a front side of the faceplate and the second pair of contacts are on a rear side of the faceplate.

21. The connector port assembly of claim 1, wherein the integrated circuit chip comprises a serial ID chip.

22. The connector port assembly of claim 21, wherein the serial ID chip is powered by a voltage received through a first of the second pair of contacts.

23. The connector port assembly of claim 22, wherein a second of the second pair of contacts receives a ground signal.

24. An RJ-45 connector port assembly, comprising:
a communications cable having first through tenth insulated conductors;
an RJ-45 jack that includes first through eighth wire connection terminals that are mounted on a first printed circuit board and that receive respective of the first through eighth insulated conductors; and
a second printed circuit board that includes ninth and tenth wire connection terminals that receive the ninth and tenth insulated conductors, respectively.

25. The RJ-45 connector port assembly of claim 24, wherein the ninth and tenth wire connection terminals comprise contact pads.

26. The RJ-45 connector port assembly of claim 24, wherein the ninth and tenth wire connection terminals comprise insulation displacement contacts.

* * * * *